US012762482B1

(12) United States Patent
Singh et al.

(10) Patent No.: US 12,762,482 B1
(45) Date of Patent: Oct. 13, 2026

(54) ADAPTIVE AGENTIC WORKFLOW PLAN GENERATION

(71) Applicant: Intuit Inc., Mountain View, CA (US)

(72) Inventors: Shubham Singh, Bangalore (IN); Kiran Hiremath, Bangalore (IN); Kalapriya Kannan, Bangalore (IN)

(73) Assignee: Intuit Inc., Mountain View, CA (US)

(*) Notice: Subject to any disclaimer, the term of this patent is extended or adjusted under 35 U.S.C. 154(b) by 0 days.

(21) Appl. No.: 19/399,585

(22) Filed: Nov. 24, 2025

(51) Int. Cl.
*G06N 5/02* (2023.01)
*G06F 40/30* (2020.01)
*G06N 20/00* (2019.01)

(52) U.S. Cl.
CPC ............. *G06N 20/00* (2019.01); *G06F 40/30* (2020.01); *G06N 5/02* (2013.01)

(58) Field of Classification Search
CPC ................................. G06N 5/02; G06N 20/00
See application file for complete search history.

(56) References Cited

U.S. PATENT DOCUMENTS

2023/0342167 A1* 10/2023 Radkoff ................ G06F 16/957
2025/0383921 A1* 12/2025 Bonatti ................. G06F 9/5027

OTHER PUBLICATIONS

Zhang, Chaoyun, et al. "Large language model-brained gui agents: A survey." arXiv preprint arXiv:2411.18279 (2024) (Year: 2024).*

Nguyen, Dang, et al. "Gui agents: A survey." Findings of the Association for Computational Linguistics: ACL 2025. 2025 (Year: 2025).*

Xu, Yiheng, et al. "Aguvis: Unified pure vision agents for autonomous gui interaction." arXiv preprint arXiv:2412.04454 (2024) (Year: 2024).*

Krogh, Anders. "Hidden Markov models for labeled sequences." Proceedings of the 12th IAPR International Conference on Pattern Recognition, vol. 3—Conference C: Signal Processing (Cat. No. 94CH3440-5). vol. 2. IEEE, 1994 (Year: 1994).*

Eisenstein, Jacob, and Charles Rich. "Agents and GUIs from task models." Proceedings of the 7th international conference on Intelligent user interfaces. 2002 (Year: 2002).*

Shi, Yucheng, et al. "Mobilegui-rl: Advancing mobile gui agent through reinforcement learning in online environment." arXiv preprint arXiv:2507.05720 (2025) (Year: 2025).*

* cited by examiner

*Primary Examiner* — Hal Schnee
(74) *Attorney, Agent, or Firm* — Dinsmore & Shohl LLP

(57) ABSTRACT

Certain aspects of the disclosure provide techniques for adaptive agentic workflow plan generation. A method generally includes determining that data, representing user interactions and previous system context that are associated with a graphical user interface (GUI), corresponds to a first navigation sequence, the first navigation sequence comprising first actions associated with the GUI for the previous system context; assigning a goal state to the first navigation sequence; generating a knowledge base comprising at least the first navigation sequence, the goal state, and an indication of first tools configured to perform the first actions; and generating, based on the knowledge base, an agentic workflow plan comprising second actions for execution by second tools to achieve the goal state, wherein the second actions and the second tools are dynamically adapted from the first actions and the first tools based on one or more factors.

20 Claims, 8 Drawing Sheets

ADAPTIVE AGENTIC WORKFLOW PLAN GENERATION

BACKGROUND

Field

Aspects of the present disclosure relate to agentic artificial intelligence (AI).

Description of Related Art

Graphical user interfaces (GUIs) are one example means by which users interact with software applications. GUIs may include graphical elements such as forms, buttons, menus, navigation panels, and/or the like. Through these interfaces, users may perform workflows by manually executing a series of actions, such as clicking buttons, entering data, and/or navigating between screens, to accomplish specific tasks and/or achieve desired outcomes. For example, a user may utilize a GUI of a business application to generate a financial report. The user may generate the report by navigating to a reports section of the application using menu options, selecting a desired report type from a list of report types, entering relevant parameters into form fields associated with the selected report type, and clicking a button to generate and display the report via the GUI.

In some cases (and as illustrated by the aforementioned example), users may be responsible for performing each step of an application workflow themselves, such as through direct interaction with a GUI. For example, an application may present the requisite interface elements for workflow completion; however, a user may be responsible for determining an appropriate sequence of actions, making decisions at each stage, and manually executing each action by interacting with the provided interface elements. This approach may be repetitive, time-consuming, and/or prone to errors, especially as workflows become more complex and/or as user needs and/or operational contexts change.

Further, in some cases, an application may not adapt to individual user preferences, real-time conditions, and/or evolving requirements, and users may need to repeat the same steps each time a task is performed. For example, a user may frequently prefer to export financial reports in a specific format (e.g., a portable document format (PDF)) when creating financial reports via an accounting software application that provides a GUI (e.g., such as QuickBooks® and its variants made commercially available by Intuit® of Mountain View, California). The accounting software application may not remember this preference, nor adjust its workflow accordingly. Thus, each time the user generates a new financial report via the accounting software application, the user may need to manually select the desired format, regardless of the user's past behavior and/or current operational context. As another example, if a new compliance requirement is introduced, such as a change in reporting standards, a user may need to be aware of the new requirement and manually incorporate it into their workflow. The accounting software application may not automatically update its workflow, nor guide the user through the necessary adjustments. As a result, users may experience delays, confusion, and/or errors, and, in some cases, the overall efficiency and reliability of workflow completion may be compromised.

As applications grow in complexity and user expectations increase, there is a need for more adaptive and intelligent solutions that are capable of reducing manual effort and enhancing operational efficiency.

SUMMARY

Certain aspects provide a method for adaptive agentic workflow plan generation. The method includes determining that first data, representing first user interactions and first previous system context that are associated with a graphical user interface (GUI), corresponds to a first navigation sequence, the first navigation sequence comprising a first ordered set of actions associated with the GUI for the first previous system context; assigning a goal state to the first navigation sequence; generating a knowledge base comprising at least the first navigation sequence, the goal state, and an indication of a first set of tools configured to perform the first ordered set of actions of the first navigation sequence; and generating, based on the knowledge base, an agentic workflow plan comprising a second ordered set of actions for execution by a second set of tools to achieve the goal state, wherein the second ordered set of actions and the second set of tools are dynamically adapted from the first ordered set of actions and the first set of tools based on one or more factors.

Certain aspects provide a method for providing agentic workflow assistance. The method includes detecting, in real time, a plurality of first current user interactions with a GUI; determining the plurality of first current user interactions corresponds to a first subset of actions of a first ordered set of actions associated with a first navigation sequence included in a knowledge base, the knowledge base further comprising, at least, for the first navigation sequence: a goal state system context an indication of a first set of tools configured to perform the first ordered set of actions of the first navigation sequence; generating, based on the knowledge base, an agentic workflow plan comprising a second ordered set of actions for execution by a second set of tools to achieve the goal state, wherein the second ordered set of actions and the second set of tools are dynamically adapted from the first ordered set of actions and the first set of tools based on one or more factors; and providing, via the GUI, agentic workflow assistance based on the agentic workflow plan.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
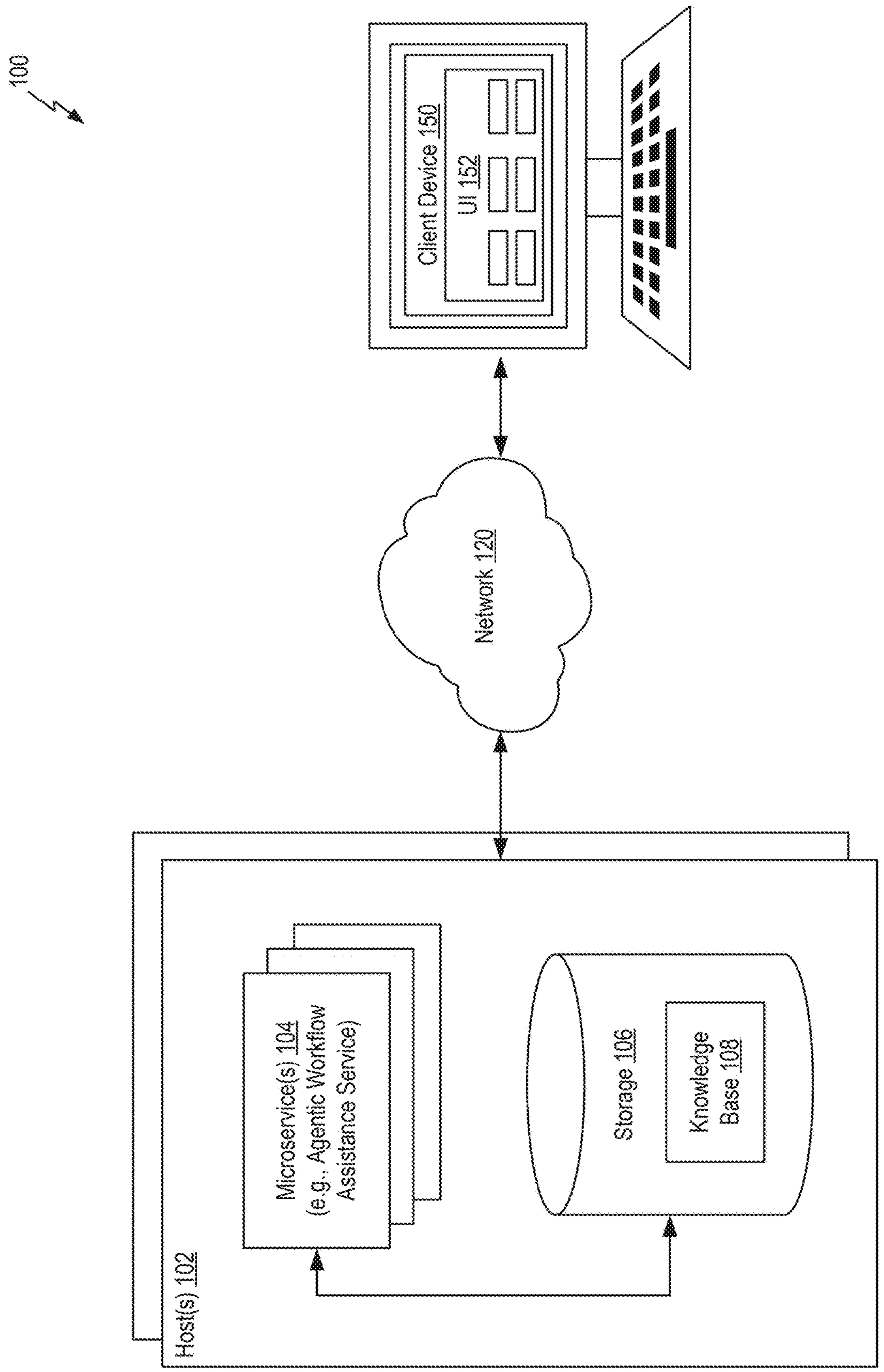
FIG. 1 is a schematic system diagram illustrating an example processing system supporting microservices interconnected via a network.

Aspects of the present disclosure provide apparatuses, methods, processing systems, and computer-readable mediums for adaptive agentic workflow plan generation for agentic artificial intelligence (AI).

"Agentic AI" refers to a class of intelligent systems in which autonomous agents are used to carry out specific tasks and/or processes with a degree of independence. An "autonomous agent" (or simply an "agent"), in this context, may refer to an autonomous software entity that is capable of perceiving its environment, making decisions, and/or taking actions to achieve specific objectives (also referred to herein as "goals"). In some cases, an agent may be used to automate complex application workflows and/or assist users by executing workflows with minimal or no human intervention. Thus, with the use of one or more agents, agentic AI systems may be designed to provide "done for you" experiences (e.g., such as via GUI-based applications), thereby helping to enhance operational efficiency and user satisfaction.

In agentic AI frameworks, an agent may autonomously follow a defined sequence of actions, or a "workflow plan," to achieve a specific goal for a user. For example, a user may request the generation of a financial report. In response to receiving the request, an agent may automatically perform the requisite steps for generating the financial report (e.g., such as selecting the appropriate report type, entering relevant parameters, and initiating the report generation process, as described above) without requiring the user to manually execute each step. Through such automation, agentic AI systems may help to streamline workflows, minimize user effort, and/or promote consistency and accuracy in workflow completion.

Despite these advantages, the implementation of agentic AI for workflow automation presents several technical challenges.

A first technical challenge is that many traditional GUI-based applications do not provide explicit, structured workflow plans that agents can readily execute. For example, application workflows may be implicit in user behavior and scattered across user interactions with a GUI of an application. As a result, there may not exist a centralized or machine-interpretable repository of workflow plans, with information about associated tools that an agent can leverage for automation of each of these workflow plans. For example, while a user may routinely perform a series of actions to submit an expense report via an accounting software application, these steps may not be captured in a form that an agent can autonomously interpret and execute. This absence of structured workflow plan knowledge may hinder the ability of agentic AI systems to deliver robust and adaptive automation.

A second technical challenge may exist for GUI-based applications that do maintain a repository of agent-executable workflow plans, such as applications where workflow plans have been manually created (e.g., by a user) and stored for agent execution. For these GUI-based applications, agents may be programmed to execute predefined, static sequences of actions to accomplish specific goals. However, when operational conditions change (e.g., such as the unavailability of a required tool), these fixed workflow plans may become suboptimal, and in some cases, infeasible. For example, consider a banking application that provides a fixed workflow plan for processing loan applications. An agent executing this plan may be programmed to automatically retrieve a customer's credit score from a specific external credit bureau's application programming interface (API). If access to that credit bureau's API is discontinued, such as due to regulatory changes and/or an update, the agent may be unsuccessful in its attempt to retrieve the credit score from the unavailable API. As a result, the agent may be unable to complete the loan processing workflow, necessitating manual intervention to obtain the credit score from a new provider and/or to update the workflow plan. The inability to dynamically adapt workflows in response to real-time changes may result in inefficiencies, errors, and/or reduced reliability, particularly in complex and/or rapidly changing environments.

A third technical challenge involves accurately identifying and executing, by agents, workflow plans with respect to the unique needs and/or preferences of individual users. In particular, users may approach identical tasks using different techniques, leveraging a variety of features and tools, and/or exhibiting distinct behaviors and preferences. For example, when scheduling a meeting using an email and scheduling software application, one user may prefer to use the application's quick-add feature to enter all details in a single step, while another use may choose to navigate through multiple GUIs of the application to specify meeting participants, location, and agenda information separately. Despite these preferences, agents may follow a single, fixed workflow plan, defined for general meeting scheduling use, and lack the ability to adapt their actions to accommodate and/or mirror individual user approaches. As a result, automated workflows may be rigid, inefficient, and/or unsatisfactory, and may fail to align with how users prefer to accomplish their tasks.

Aspects described herein overcome the aforementioned technical problems and improve upon the state of the art by introducing techniques for generating a knowledge base that facilitates adaptive agentic workflow plan generation. In this context, a "knowledge base" may refer to a systematically organized repository that captures information about agent-executable workflow plans (referred to herein as "agentic workflow plans"). For example, the knowledge base may include, for each agentic workflow plan, an indication of (1) a respective sequence of actions associated with the agentic workflow plan, (2) a respective goal state that may be achieved following successful completion of the respective sequence of actions, and (3) software tool(s) that may be utilized by agent(s) to perform each action in the respective sequence. In certain aspects, the knowledge base may be automatically created and updated by monitoring user interactions with a GUI, analyzing these interactions to identify sequences of actions associated with the GUI (referred to herein as "navigation sequences") that users perform to achieve particular goals, and abstracting these sequences into structured descriptions of workflow plans for storage in the knowledge base. Once established, the knowledge base may enable the generation of agentic workflow plans that are dynamically adapted to a current user, current system context, current operational conditions, and/or optimization criteria. In certain aspects, an agent may utilize a generated agentic workflow plan to provide agentic workflow assistance. Example agentic workflow assistance may include autonomously executing actions of the agentic workflow plan on behalf of a user, proactively guiding a user through one or more actions of the workflow plan, and/or intervening to address error-prone and/or non-terminating actions during workflow execution by the user.

As described herein, the generation and refinement of a knowledge base may include (1) data collection, (2) navigation sequence identification, (3) goal state association, and, in some cases, (4) navigation sequence filtering (e.g., to exclude error-prone, non-terminating, and/or otherwise unproductive agentic workflow plans from the knowledge base). Various techniques may be employed to perform each of these steps, thereby enabling the knowledge base to capture a robust and adaptable set of agentic workflow plans that support dynamic and context-aware workflow automation.

Figure 2:
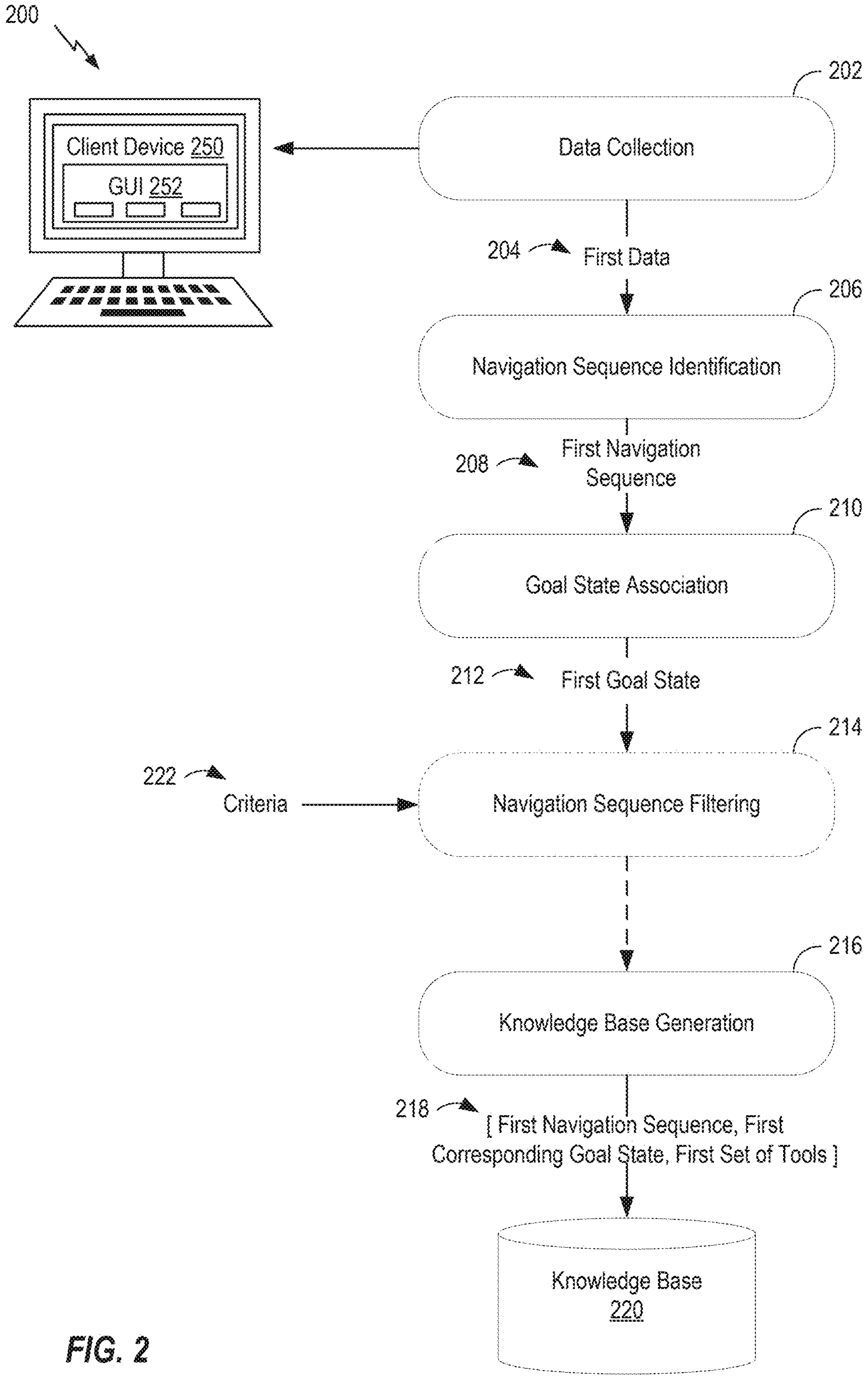
FIG. 2 depicts an example workflow for generating a knowledge base.

Additional details related to the generation of a knowledge base are provided herein with respect to FIG. 2. Additional details related to the generation of an agentic workflow plan, such as based on current user preferences, current system context, current operational conditions, and/or optimization criteria, are provided herein with respect to FIG. 3. Further, additional details related to providing agentic workflow assistance are provided herein with respect to FIG. 4.

As used herein, "current user preferences" may refer to choices, settings, behaviors, and/or tendencies exhibited and/or selected by a user (e.g., such as for a particular time period, such as a current time period), which may influence the adaption of workflow plans for execution. Example current user preferences may include, but are not limited to, preferred features, preferred shortcuts, frequently used tools, desired order of workflow steps, default values for forms, interface customization options, and any other user-specific selections and/or patterns that may affect how an agent responds to and/or assists a user during workflow execution.

As used herein, "current system context" may refer to information that characterizes the current state, configuration, and/or environment of a computing system during a time period when user interactions are occurring. Example current system context may include, but is not limited to, the version of the application or software in use; the type of device being used (e.g., such as a desktop, laptop, tablet, or smartphone); the browser type and version; the operating system and its version; network status and bandwidth availability; and/or user session information (e.g., such as user identity, authentication status, permissions, roles, and/or navigation history). System context may further encompass the current state of the GUI, including which screens, pages, and/or dialogs are currently displayed to the user, and which interface elements (e.g., such as buttons, fields, and/or menus) are visible, enabled, and/or active for user interaction. Additional aspects of system context may include the data currently being processed or displayed (e.g., such as which records, forms, and/or objects are open and/or being edited), relevant configuration settings, and/or other variables and/or conditions that may influence system and/or user behavior. System context may provide situational awareness that enables adaptive systems to tailor workflow plans, actions, or responses to the specific circumstances present during user interaction.

As used herein, "current operational conditions" may refer to a set of circumstances and/or constraints that are associated with and/or present in a computing environment during a given time period. Example current operational conditions may include, but are not limited to: time of day; system downtime and/or maintenance windows; peak usage periods and/or system load; availability of certain software tools and/or external services; scheduling constraints (e.g., such as actions that need to be performed by a specific time); and security requirements. These conditions may dynamically change and influence how workflows are adapted and executed (e.g., by agents).

As used herein, "optimization criteria" may refer to a set of parameters, objectives, or rules that are used to evaluate and adapt workflow plans in order to achieve the most desirable or efficient outcome. Example optimization criteria may guide the selection, sequencing, and/or modification of actions within a workflow plan, or tools associated with the performance of those actions, based on factors such as minimizing execution time, reducing resource usage, maximizing reliability or accuracy, improving user satisfaction, balancing system load, meeting cost and/or budget constraints, and/or ensuring compliance with applicable policies and/or regulations. By applying optimization criteria, workflow plans may be dynamically tailored to best satisfy the current operational goals and/or system requirements.

The techniques described herein provide notable technical advantages over conventional solutions, particularly through the automated creation of a knowledge base that supplies agents with workflow plans that are readily executable. Unlike some conventional systems that require users and/or administrators to manually define, curate, and maintain workflow plans, the disclosed techniques enable a knowledge base to be generated and updated automatically (e.g. with little or no human intervention) based on observed user interactions and contextual information. This helps to significantly reduce the manual effort required to create and manage workflow plans and provides a centralized repository of agent-executable workflow plans that may be absent in conventional solutions, as described above. As a result, agents may be equipped with a comprehensive and up-to-date set of workflow plans.

The techniques described herein further provide the technical advantage of automatically identifying navigation sequences that do not contribute to successful goal achievement, such as those that are error-prone, non-terminating, and/or otherwise unproductive, and excluding such navigation sequences from being added to the knowledge base. This filtering capability helps to enhance the quality and reliability of workflow plans represented in the knowledge base and, in turn, helps to improve the efficiency, effectiveness, and/or overall performance of automated workflow execution (and agents that execute these workflows autonomously).

Furthermore, the techniques described herein enable workflow plans to be dynamically adapted in real time, addressing additional technical challenges associated with the use of static and/or fixed workflow plans. By leveraging the knowledge base, agents may generate and execute workflow plans that are responsive to changes in user preferences, system context, and/or operational conditions. This adaptability helps to ensure that workflow automation remains robust, efficient, and aligned with user needs.

Notably, the improved techniques described herein can enhance the capabilities of applications that support automated workflow execution or agentic assistance. By systematically capturing and organizing workflow plans in a knowledge base, the techniques described herein help to enable the generation and execution of workflows that are dynamically tailored to individual users and/or evolving operational contexts. This may result in improved reliability, flexibility, and user experience in workflow automation. Consequently, applications employing these techniques may be better equipped to overcome the inefficiencies and limitations of conventional solutions, supporting more scalable, effective, and user-centric (e.g., responsive to and focused on an individual user) workflow automation across diverse application environments.

Example System for Providing Agentic Workflow Assistance

FIG. 1 depicts an example system 100 supporting a plurality of microservices 104 (e.g., software-defined services, which in some cases, may be cloud-native). As shown in FIG. 1, system 100 includes one or more client devices 150 (collectively referred to herein as "client devices 150") and one or more hosts 102 (collectively referred to herein as "hosts 102"). A network 120 may provide connectivity between client device 150 and host 102. Network 120 may include, for example, a direct link, a local area network (LAN), a wide area network (WAN) (such as the Internet), another type of network, or a combination of one or more of these networks.

Host 102 may be geographically co-located servers on the same rack or on different racks in any arbitrary location in a data center. Host 102 may be implemented on a server-grade hardware platform. Host 102 or the hardware platform may include components of a computing device, such as one or more processors (e.g., central processing units (CPUs)), one or more memories (e.g., random access memory (RAM)), one or more network interfaces (e.g., physical network interfaces (PNICs)), storage 106, and/or other components, as described elsewhere herein. Storage 106 and other example components of an apparatus that may implement host 102 are described elsewhere herein.

Host 102 in system 100 may host a set of one or more microservices 104 (collectively referred to herein as "microservice(s) 104"). The microservice(s) 104 may be deployed using virtual machines (VMs) and/or container(s) implemented on host 102). For example, host 102 may implement a hypervisor (not shown) that abstracts processor, memory, storage, and networking resources of host 102's hardware platform). Generally, a microservice 104 is a loosely coupled and independently deployable service or software that, alone or in combination with one or more other microservices 104, may make up an application. Microservice(s) 104 may enable segmented, granular level functionalities within a larger system infrastructure. A reference to a single microservice 104 can encompass multiple microservices 104, unless context indicates otherwise.

Client device 150 may include a user interface (UI) 152. UI 152 may be usable to communicate with microservice 104 via network 120. For example, communication between client devices 150 and a microservice 104 may be facilitated by one or more application programming interfaces (APIs). An API is a set of rules and protocols that allows different software applications to communicate and share data with each other. Non-exhaustive examples of client devices 150 may include a smartphone, a personal computer, a tablet, or a laptop computer. In some examples, microservice 104 may interact with another microservice, an application, a host, or the like, via network 120.

As shown in FIG. 1, in certain aspects, microservice 104 implements an agentic workflow assistance service, which is any network 120 accessible service that provides workflow assistance based on agentic workflow plans that are dynamically generated and adapted for a specific user and/or system environment. The agentic workflow assistance service may determine an agentic workflow plan to execute by consulting a knowledge base 108 of agent-executable workflow plans (e.g., included in storage 106) and considering factors such as current user preferences, system context, operational conditions, and/or optimization criteria, as described with respect to FIGS. 3 and 4. In certain aspects, the agentic workflow assistance service may generate and update the knowledge base 108. For example, as described with respect to FIG. 2, the agentic workflow assistance service may monitor user interactions with a GUI and analyze those user interactions to identify, structure, and store workflow plans (e.g., navigation sequences associated with ordered sets of actions and sets of tools for performing the ordered sets of actions), along with relevant contextual information, in the knowledge base 108. A microservice 104, or a host 102 that implements a microservice 104, may be referred to as an apparatus.

Though FIG. 1 depicts host 102, storage 106, and client device 150 as single devices for ease of illustration, host 102, storage 106, and/or client device 150 may be embodied in a variety of forms. Further, though FIG. 1 depicts only one host 102 and one client device 150, other examples may include a different number of hosts 102 and/or client devices 150. Client devices 150 may use any combination of microservices 104 on any host 102 where microservices 104 are deployed.

Example Workflow for Knowledge Base Generation

FIG. 2 depicts an example workflow 200 for generating a knowledge base 220. More specifically, workflow 200 depicts a sequence of operations that may be used to transform raw user interaction data into structured agentic workflow plans, which make up knowledge base 220. As shown in FIG. 2, the sequence of operations may include data collection 202, navigation sequence identification 206, goal state association 210, optionally, navigation sequence filtering 214, and knowledge base generation 216. In certain aspects, workflow 200 may be performed by the agentic workflow assistance service depicted and described above with respect to FIG. 1.

Generation of knowledge base 220 via workflow 200 begins with performing data collection 202 to obtain first data 204. For example, data collection 202 may involve monitoring and recording (1) user interactions with a GUI, such as GUI 252 of client device 250 (e.g., an example of UI 152 associated with client device 150 in FIG. 1), as well as (2) information about the current state, configuration, and/or environment associated with GUI 252 during a time period when the user interactions are occurring (referred to herein as "previous system context"). As such, first data 204 may include data that represents user interactions associated with GUI 252 and previous system context associated with GUI 252.

In certain aspects, first data 204 comprises clickstream data (e.g., a chronological record of user interactions with interface elements of GUI 252). Example clickstream data may include button clicks, page transitions, and/or menu selections, among other examples. In certain aspects, first data 204 comprises GUI instrument data (e.g., detailed information about the state and/or behavior of interface elements associated with GUI 252). The GUI instrumentation data may describe the real-time state of GUI 252. Example GUI instrumentation data may include information about which buttons are enabled and/or which fields are visible when user interactions with GUI 252 are observed and recorded, among other examples. In certain aspects, first data 204 comprises static code analysis data (e.g., information obtained by analyzing an application's codebase without execution). In certain aspects, first data 204 comprises runtime profiling data (e.g., metric(s) collected during application execution). Example runtime profiling data may include central processing unit (CPU) usage, memory allocation, performance statistics, and/or input/output (I/O) operations, among other examples.

As an illustrative example, data collection 202 may be performed to collect first data 204 associated with a GUI of an example accounting software application. In this example, first data 204 may include a record of a user interactions comprising navigation to an "Expenses" section of the software application, interaction with a "Submit Expense Report" button, entering multiple amounts in a displayed expense report form, and uploading a receipt, along with the system context at each step.

In certain aspects, real-time user navigation profiling techniques may be used during data collection 202. Real-time user navigation profiling techniques may refer to techniques that actively track and organize individual user interactions with GUI 252 as they occur, such as to reconstruct a complete sequence of actions a user takes to accomplish a goal within the application. Instead of simply logging each action in isolation, real-time user navigation profiling techniques may be used to link user interactions with GUI 252 together to form a coherent user journey, providing context for how and why one or more of the user interactions are performed. In certain aspects, navigation profiling techniques may include session reconstruction, path analysis, and/or state-based navigation tracking techniques to understand the transitions between different GUI-based actions by the user and interface states. "Session reconstruction" may involve chronologically piecing together a user's interactions, such as clicks and page loads, during a single visit to replay their exact journey via GUI 252. "Path analysis" refers to the study of the various sequences of pages or actions users commonly take, helping to identify the most frequent routes, decision points, and/or potential bottlenecks in navigation. "State-based navigation tracking" may be used to map GUI 252 into distinct "states" (e.g., 'viewing product', 'in cart', 'checkout') and record the transitions between these states to understand how users move through defined workflows.

Workflow 200 then proceeds with performing navigation sequence identification 206 to identify one or more navigation sequences in first data 204, such as first navigation sequence 208. For example, navigation sequence identification 206 may involve analyzing first data 204 to detect one or more patterns of user interactions that are commonly associated with GUI 252, referred to herein as "navigation sequences." A "navigation sequence" may refer to a set of ordered actions that may be performed by a user (or an agent) when interacting with the GUI. A navigation sequence may be considered "common" if it is observed frequently across multiple user sessions and/or by different users when performing similar tasks, such as to achieve similar goals within an application.

First navigation sequence 208 may be associated with a first pattern of user interactions (and associated system context) included (and identified) in first data 204. In certain aspects, the first pattern of user interactions included in first data 204 may be more detailed and/or user-specific than the corresponding first navigation sequence 208. For example, first navigation sequence 208 may comprise an ordered set of actions commonly used for report generation that includes [Login→Search for "Profit and Loss"→Generate Report]. The first pattern of user interactions identified in first data 204 may also include each of these actions; however, the first pattern of user interactions may additionally include an action of "Select Report Format as PDF" prior to "Generate Report" (e.g., [Login→Search for "Profit and Loss"→Select Report Format as PD→Generate Report]). Although this additional action reflects a user preference and/or customization, the performance of navigation sequence identification 206 may still result in identifying the first pattern of user interactions as the first navigation sequence 208, associated with the generation of a report. In this way, navigation sequence identification 206 may involve the identification of core workflows, or "navigation sequences," in first data 204 even when there are variations and/or deviations in individual user behaviors that are captured in first data 204.

In certain aspects, navigation sequence identification 206 may utilize sequential pattern mining to analyze first data 204. In this context, "sequential pattern mining" refers to a data mining technique that may be used to identify frequently occurring ordered sequences of actions within user interaction data (e.g., for a GUI), such as to discover common sequences across multiple user sessions and/or multiple users. Sequential pattern mining may involve (1) analyzing historical user interaction data to extract sequences of actions that appear with high frequency and then (2) comparing new user interaction data (e.g., for the GUI) to the established patterns to determine whether the new user interaction data corresponds to one of the identified navigation sequences. In certain aspects, this comparison may be based on similarity metrics and/or thresholds, thereby allowing for the identification of navigation sequences even when there are minor variations and/or additional steps in a user's actions with the GUI.

For example, a sequential pattern mining algorithm may be applied to historical data, representing historical user interactions and historical system context that are associated with GUI 252, such as to identify multiple navigation sequences, including the first navigation sequence 208. Each navigation sequence may include a respective ordered set of actions. The sequential pattern mining algorithm may then be applied to first data 204 to determine whether the user interactions with GUI 252, captured in first data 204, correspond to one of the previously-identified navigation sequences. In this example, application of the sequential pattern mining algorithm to first data 204 may reveal that first data 204 corresponds to the first navigation sequence 208, or more specifically, a first pattern of user interactions with GUI 252 included in first data 204 corresponds to first navigation sequence 208. For example, the similarity of user interactions captured in first data 204 to the ordered set of actions for first navigation sequence 208 may be greater than the similarity of user interactions captured in first data 204 to any other navigation sequence (although there are minor variations and/or additional steps present). As another example, the similarity of user interactions captured in first data 204 to the ordered set of actions for first navigation sequence 208 may be greater than a similarity threshold; thus, first data 204 may correspond to the first navigation sequence 208.

In certain aspects, navigation sequence identification 206 may employ a Hidden Markov Model (HMM) to analyze first data 204. For example, first data 204 may be modeled as a plurality of observable outputs of the HMM, and a sequence of hidden states may be inferred based on the observable outputs. Identifying that first data 204 corresponds to first navigation sequence 208 during navigation sequence identification 206 may be based on both the observable outputs and the inferred hidden states. For example, the observable outputs may include user interactions with GUI 252 such as [Click "Login" button→Click "Reports" button→Click "Generate" button], while the inferred hidden states may represent underlying workflow stages such as [Authentication→Report Navigation→Report Generation]. The first navigation sequence 208 may then be identified as the ordered set of actions (of a navigation sequence) that correspond to the inferred workflow stages and the observable user interactions with GUI 252.

In certain aspects, navigation sequence identification 206 may utilize a machine learning (ML) model, such as a deep learning model for sequence prediction, to classify or predict navigation sequence(s) for first data 204. For example, an ML model may be trained on labeled user interaction data to learn complex dependencies and patterns in multiple navigation sequences. After training, the ML model may be used to process first data 204 and generate an output indication (e.g., a classification or prediction) that first data 204 corresponds to first navigation sequence 208 (e.g., or more specifically, a first pattern of user interactions in first data 204 corresponds to first navigation sequence 208). For example, an ML model may be trained to recognize that a sequence of GUI-based user interactions, including [Login→Search for "Profit and Loss"→Select Report Format→Generate Report] corresponds to a "Generate Profit and Loss Report" navigation sequence, even if the order or presence of one or more of these actions varies between users. This trained ML model then be used to process first data 204 and recognize that a first pattern of user interactions in first data 204 corresponds to the "Generate Profit and Loss Report" navigation sequence (e.g., an example of the first navigation sequence 208). Example ML models that may be used include Markov Models (or Chains), which predict the next step in a sequence based only on the current state; Recurrent Neural Networks (RNNs), which maintain a memory of previous actions in the sequence; Gated Recurrent Units (GRUs), which use gates to efficiently manage sequence memory; Long Short-Term Memory (LSTM) networks, which use a complex set of gates to capture long-range dependencies in navigation history; and/or transformers, which use self-attention mechanisms to weigh the importance of actions in a sequence simultaneously.

In certain aspects, navigation sequence identification 206 may utilize the current system context, included as part of first data 204, to help improve the accuracy of identifying navigation sequences. For example, in certain aspects, current system context such as the application version, device type, user role, and/or visible interface elements, may be to filter and/or prioritize navigation sequences that are most applicable to the user's current computing environment. In certain aspects, the current system context may be used to segment user interaction data, included as part of first data 204, into meaningful sessions and/or to disambiguate between similar navigation sequences by considering which workflows are typical for the detected context. Thus, by leveraging the current system context, navigation sequence identification 206 may more effectively recognize workflows that are appropriate for the specific circumstances in which the user is operating.

Following navigation sequence identification 206, workflow 200 proceeds with goal state association 210. Goal state association 210 may involve assigning a goal state to each navigation sequence identified during navigation sequence identification 206. For example, in FIG. 2, goal state association 210 may involve assigning a first goal state 212 to first navigation sequence 208. A "goal state" may refer to a specific objective and/or outcome that is achieved upon successful completion of the ordered set of actions associated with a corresponding navigation sequence. In certain aspects, associating navigation sequences with goal states may enable a system to interpret the intent behind user workflows and to facilitate goal-driven workflow automation.

In certain aspects, goal state association 210 may utilize heuristic-based rules. "Heuristic-based rules" may refer to logic or criteria that associates specific navigation sequences with known goal states based on observed patterns and/or domain knowledge. For example, one heuristic rule may specify that a navigation sequence associated with an ordered set of actions including [Access "Bills to Pay"→Record Payment] corresponds to a goal state of "Record Payment" (e.g., establishes a mapping between this navigation sequence and goal state "Record Payment"). Application of this heuristic rule to first navigation sequence 208, in cases where first navigation sequence 208 includes a first ordered set of actions including [Access "Bills to Pay"→Record Payment], then the first goal state 212 assigned to first navigation sequence 208 may comprise the "Record Payment" goal state. In certain aspects, the heuristic-based rules may be developed based on common user workflows and/or business processes. In certain aspects, the use of heuristic-based rules may allow for efficient and interpretable goal assignment, particularly in environments where typical navigation sequences and their corresponding goals are well established.

In certain aspects, goal state association 210 may utilize one or more ML models for assigning goal states to navigation sequences, such as first goal state 212 to first navigation sequence 208. For example, an ML model may be trained on a dataset of labeled navigation sequences and their corresponding goal states (e.g., "training data"). The trained ML model may then be used to process unlabeled navigation sequences (e.g., such as first navigation sequence 208 in FIG. 2) to predict corresponding goal states (e.g., such as first goal state 212 in FIG. 2). For example, an ML model may be trained to recognize that a first ordered set of actions associated with first navigation sequence 208, such as [Login→Search for "Profit and Loss" Report→Select Report Format→Generate Report] corresponds to the first goal state 212, e.g., "Generate Profit and Loss Report." The ML model may be trained to predict and assign this first goal state 212 to first navigation sequence 208 even in cases where first navigation sequence 208 includes additional and/or reordered actions. As such, generalization of goal association across various navigation sequences may be enabled.

Various ML models may be used for goal state association 210. For example, in certain aspects, supervised models such as classification algorithms (e.g., including decision trees, random forests, and support vector machines) or deep neural networks may be applied for complex pattern recognition and goal state prediction. In certain aspects, unsupervised learning techniques, such as clustering, may also be used to discover patterns in unlabeled navigation sequence data and assist in associating navigation sequences with goal states.

In certain aspects, goal state association 210 may utilize semantic tagging techniques to assign goal states to navigation sequences, such as first goal state 212 to first navigation sequence 208. For example, in certain aspects, semantic tagging techniques may include assigning descriptive tags to individual action(s) and/or group(s) of actions within an ordered set of actions associated with a navigation sequence. These descriptive tags may be used to infer an associated goal state for each navigation sequence. As an illustrative example, a first ordered set of actions associated with first navigation sequence 208 may include five actions, [Action 1→Action 2→Action 3→Action 4→Action 5]. Semantic tagging may involve tagging actions 1 and 2 as "submit," tagging actions 3 and 4 as "finalize," and action 5 as "complete." These tags may indicate that the goal state, associated with first navigation sequence 208, comprises the successful submission of a form, report, and/or transaction. Accordingly, the first goal state 212 assigned to first navigation sequence 208, during goal state association 210, may comprise a goal state associated with the successful submission of a form, report, and/or transaction. As illustrated by this example, semantic tagging techniques may leverage the semantic meaning of user actions to help improve goal association accuracy.

In certain aspects, goal state association 210 may incorporate user feedback loops. User feedback loops may be used to prompt users to confirm and/or specify a goal state that is associated with a particular navigation sequence. In certain aspects, performance of goal state association 210 may be based on this feedback. As an illustrative example, a user may specify that first navigation sequence 208 corresponds to first goal state 212. Goal state association 210 may involve assigning first goal state 212 to first navigation sequence 208 based on this feedback. In certain aspects, user feedback may be used to refine and/or validate goal state association 210. As an illustrative example, an autonomous agent may carry out a first ordered set of actions associated with first navigation sequence 208. After successful completion of the first ordered set of actions, a user may be prompted to confirm whether first goal state 212 assigned to first navigation sequence 208 was achieved and update, accordingly, goal association logic, used to perform goal state association 210, based on the user's feedback. In certain aspects, utilization of user feedback loops may enable continuous improvement of goal state association 210 (e.g., based on real-world user input) to help improve goal state association accuracy.

After assigning first goal state 212 to first navigation sequence 208, workflow 200 proceeds with knowledge base generation 216. Knowledge base generation 216 may involve creating a new entry 218 in knowledge base 220 that includes information about the first navigation sequence 208, such as the first ordered set of actions associated with first navigation sequence 208 and its assigned first goal state 212. In certain aspects, the new entry 218 may further include system context information (e.g., from first data 204 and associated with first navigation sequence 208), such user session information for a user that performed user interactions associated with the first navigation sequence 208, a state of GUI 252 when the user interactions were performed and recorded, a browser type and version utilized by the user, and/or the like In certain aspects, knowledge base generation 216 further involves identifying a first set of tools (e.g., software tools and/or components) that may be used to perform the first ordered set of actions associated with first navigation sequence 208. For example, knowledge base generation 216 may involve identifying which agent(s), application programming interface(s), and/or application module(s) may be used to execute each action of the first ordered set of actions. This identification may be based on the system context information associated with first navigation sequence 208. For example, for a first action in the first ordered set of actions comprising generating a report, a specific reporting tool and/or API used to perform this generation may be selected based on a device type and a version of an application that was currently in use by a user when first data 204 was collected. In certain aspects, the new entry 218 in knowledge base 220 further includes information about the first set of tools that may be used to perform the first ordered set of actions associated with first navigation sequence 208 (e.g., as shown in FIG. 2).

In certain aspects, data collection 202, navigation sequence identification 206, goal state association 210, and knowledge base generation 216 are repeated multiple times such that multiple new entries are added to knowledge base 220. Each entry may be associated with a navigation sequence for GUI 252. Each entry, for each navigation sequence, may include information about a respective ordered set of actions that are associated with the navigation sequence, a respective goal state assigned to the navigation sequence, and/or a respective set tools that may be used to perform the respective ordered set of actions. For example, an example entry in knowledge base 220 for a particular navigation sequence may include [Navigation Sequence, Ordered Set of Actions, Goal State, Set of Tools]. As such, knowledge base 220 may serve as a comprehensive and structured repository of agent-executable workflow plans, each entry capturing important information that may be used by agents to generate, adapt, and/or execute workflows that are responsive to user needs, system context, and operational requirements.

In certain aspects, workflow 200 optionally includes the performance of navigation sequence filtering 214 to identify and exclude navigation sequences that do not contribute meaningful knowledge to knowledge base 220. In certain aspects, navigation sequence filtering 214 may be performed based on criteria 222, which defines the requirements that a navigation sequence may need to meet to be included in the knowledge base 220. Navigation sequences that do not satisfy these criteria 222 may be excluded from knowledge base 220 (e.g., not added to knowledge base 220 as a new entry during knowledge base generation 216). In certain aspects, the criteria 222 may help to identify navigation sequences with specific characteristics, such as being error-prone (e.g., being associated with an error or failure rate that exceeds a threshold), non-terminating (e.g., being associated with an ordered set of actions that represents a recursive loop), resulting in user abandonment or task cancellation, and/or being incompatible with available tools and/or system resources. For example, a navigation sequence that repeatedly cycles between two screens without reaching a goal, or a navigation sequence that consistently results in error messages, may be identified during navigation sequence filtering 214 and excluded from the knowledge base 220.

In certain aspects, navigation sequence filtering 214 may utilize one or more ML models to perform such filtering. In certain aspects, the ML model(s) may be trained to recognize navigation sequences that result in dead ends, non-terminating loops, excessive errors, and/or frequent user abandonment. In certain aspects, the ML model(s) may be trained to identify patterns, in ordered sets of actions (e.g., associated with navigation sequences) such as exploratory wandering (e.g., where a user navigates through unrelated sections of GUI 252 without completing a task) and/or the repeated use of a "back" button to correct mistakes, among others. In certain aspects, the ML model(s) may be trained to identify navigations sequences that result in user abandonment before reaching a goal and/or that include multiple failed attempts to complete a task, among others.

In certain aspects, navigation sequence filtering 214 may also involve removing system-generated and/or low-level noise. This may include background processes, such as auto-saving events, telemetry pings, and/or non-committal GUI 252 events, such as hovers and/or scrolls. Navigation sequences that are artifacts of system design, such as login redirects, marketing interstitials, feature-flag checks, and/or passive telemetry, may also be excluded. For example, a navigation sequence associated with an ordered set of actions that include only a login event followed by an immediate logout, or a series of system-generated background syncs, may be identified during navigation sequence filtering 214 and thus, not be included in knowledge base 220.

By filtering out these noise-adding navigations sequences, the knowledge base 220, (e.g., created via workflow 200) may include only high-quality, stable, and accurate navigation sequences. This improves the reliability and effectiveness of workflow plans generated by agentic AI systems (e.g., agents) based on the knowledge base 220, thereby helping to support robust and user-centric workflow automation.

Knowledge base 220, generated based on the performance of workflow 200, may be utilized to generate agentic workflow plans that are dynamically adapted for a current user, current system context, current operational conditions, and/or optimization criteria. These agentic workflow plans may then be executed by agent(s) to provide agentic workflow assistance, which may include autonomously performing action(s) associated with the agentic workflow plans, guiding users through one or more action(s) of the agentic workflow plan(s), intervening to address errors and/or inefficiencies during execution, by users, of action(s) associated with the agentic workflow plan(s), and/or the like. Additional details regarding the generation of agentic workflow plans based on knowledge base 220 are provided below with respect to FIG. 3. Further details related to the provision of agentic workflow assistance are provided below with respect to FIG. 4.

Example Generation of an Adaptive Agentic Workflow Plan

Figure 3:
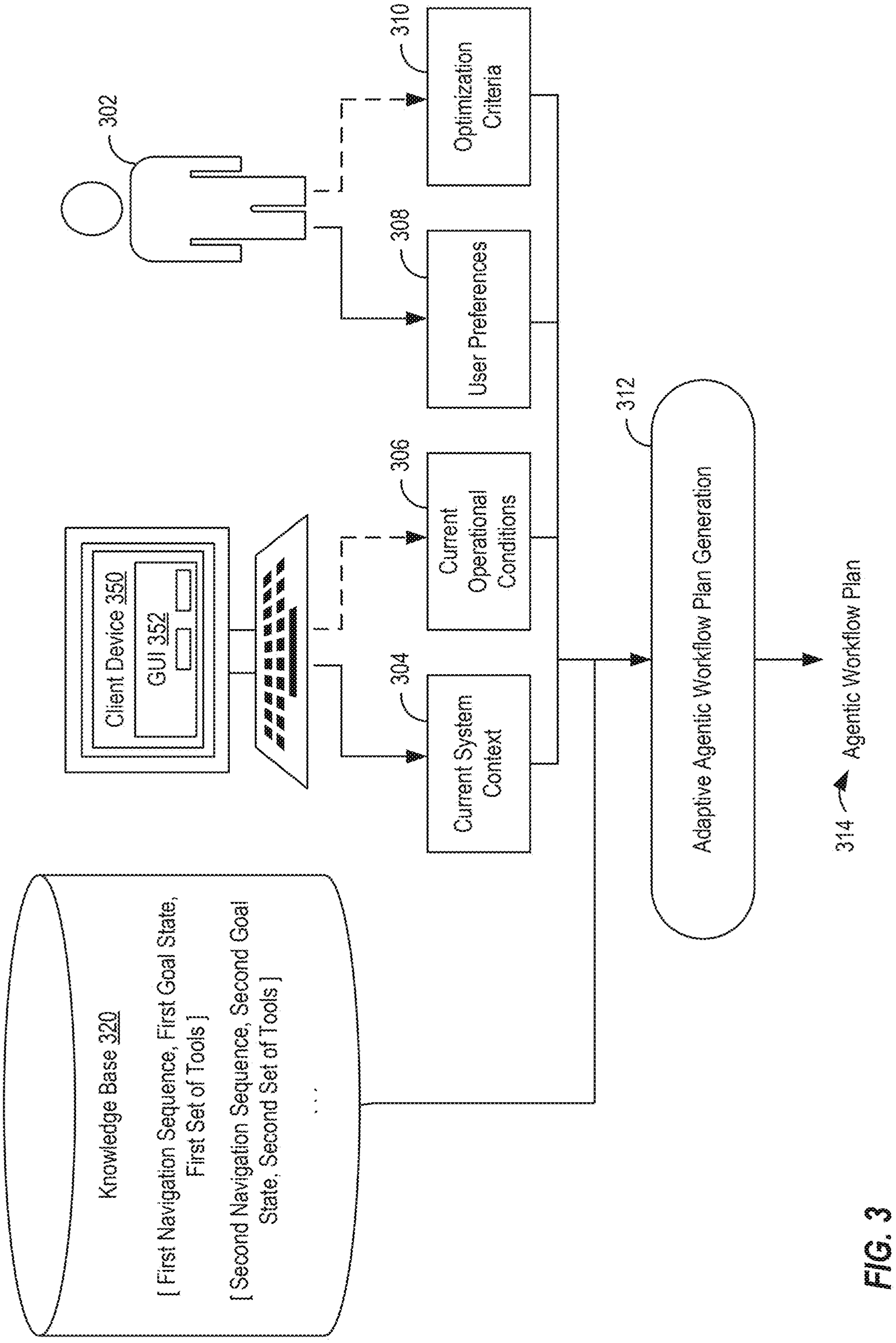
FIG. 3 depicts example generation of an agentic workflow plan.

FIG. 3 depicts example adaptive agentic workflow plan generation 312 to generate an agentic workflow plan 314. Adaptive agentic workflow plan generation 312 may be performed utilizing a knowledge base 320, and the agentic workflow plan 314 that is generated may be generated based on user preferences 308, current system context 304, current operational conditions 306, and optimization criteria 310. In certain aspects, knowledge base 320 may be an example of knowledge base 220 that is generated according to workflow 200, depicted and described above with respect to FIG. 2.

As shown in FIG. 3, adaptive agentic workflow plan generation 312 involves generating an agentic workflow plan 314 by selecting and adapting an ordered set of actions and/or a set of tools, associated with a navigation sequence entry in knowledge base 320. The actions and tools included in agentic workflow plan 314 may be dynamically adapted based on a variety of factors, including current system context 304, current operational conditions 306, user preferences 308, current system context 304, current operational conditions 306, and/or optimization criteria 310.

Current system context 304 may comprise information about the state and environment of client device 350, GUI 352, and/or an application running on client device 350 and providing GUI 352 (e.g., where GUI 352 of client device 350 is an example of UI 152 associated with client device 150 in FIG. 1) during a time period when agentic workflow plan 314 is being generated (e.g., via adaptive agentic workflow plan generation 312). For example, current system context 304 may include information about an application version, device type, user identity, and/or which interface elements are currently available. In certain aspects, during adaptive agentic workflow plan generation 312, the current system context 304 may be compared to the system context information stored in knowledge base 320 for a given workflow (and more specifically a given navigation sequence) that is being adapted. If differences are detected, such as a change in device type, user identity, and/or available features, adaptation of the ordered set of actions and/or the set of tools associated with the navigation sequence (e.g., stored in knowledge base 320), may be adapted. For example, if a user 302 is operating from a mobile device but the navigation sequence in knowledge base 320 is associated with an ordered set of actions that may be performed in a desktop environment, then during adaptive agentic workflow plan generation 312, the ordered set of actions associated with the navigation sequence may be adapted to include mobile-optimized actions and/or adapted to omit action(s) that are not supported on the mobile device. As another example, a navigation sequence stored in knowledge base 320 may be associated with an ordered set of actions that may be performed using a set of tools that a first user with first permissions has access to but a current user 302 does not have access to (e.g., user 302 may have a second permissions that are more limiting than the first permissions of the first user; thus, user 302 may not have access to or a license to use one or more of the tools in the set of tools). Thus, during adaptive agentic workflow plan generation 312 when an agentic workflow plan 314 is generated to provide agentic workflow assistance for user 302, the ordered set of actions associated with the navigation sequence may be adapted to modify the tool(s) used to perform one or more actions and that require higher-level access, such as to help ensure the agentic workflow plan 314 is capable of being executed for user 302.

Current operational conditions 306 may comprise information about the circumstances and constraints present in the computing environment during a time period when agentic workflow plan 314 is being generated. For example, current operational conditions 306 may include information about the time of day, system downtime or maintenance windows, peak usage periods, system load, availability of software tools and/or external services, scheduling constraints, and/or security requirements, to name a few. In certain aspects, during adaptive agentic workflow plan generation 312, current operational conditions 306 may be evaluated to determine if adaptation of an ordered set of actions and/or a set of tools associated with a navigation sequence in 320 is needed. For example, knowledge base 320 may indicate that to perform a first action for a first navigation sequence, a first tool may be used. If this tool is determined to be unavailable due to maintenance (e.g., based on the current operational conditions 306), then during adaptive agentic workflow plan generation 312, the set of tools associated with the navigation sequence may be adapted to substitute an alternative tool or to delay execution until the tool becomes available. As another example, if current operational conditions 306 specify that a particular action associated with the navigation sequence needs to be performed by a specific deadline, then during adaptive agentic workflow plan generation 312, the ordered set of actions associated with the navigation sequence may be adapted to reorder the ordered set of actions and/or prioritize this time-sensitive action.

User preferences 308 may comprise information about the choices, settings, and/or behaviors exhibited and/or selected by user 302 (e.g., such as during interaction with GUI 352). For example, user preferences 308 may include a preferred report format, frequently used features, default values for form fields, and/or a preferred order of workflow steps, to name a few. In certain aspects, during adaptive agentic workflow plan generation 312, agentic workflow plan 314 may be adapted based on the current user's preferences. For example, knowledge base 320 may include an entry for a navigation sequence associated with a report generation workflow. Current user 302 may prefer to export reports in PDF format. Based on this user preference, during adaptive agentic workflow plan generation 312, an ordered set of actions associated with the navigation sequence (e.g., stored in knowledge base) may be adapted to include an additional action that involves adjusting the format for a report that is generated to a PDF option.

Optimization criteria 310 may comprise a set of parameters, objectives, and/or rules used to evaluate and adapt navigation sequences (e.g., stored in knowledge base 320) to achieve a most desirable and/or efficient outcome. Example optimization criteria 310 may include minimizing execution time, reducing resource usage, maximizing reliability, improving user satisfaction, balancing system load, and/or ensuring compliance with policies and/or regulations, to name a few. In certain aspects, during adaptive agentic workflow plan generation 312, optimization criteria 310 may be applied to select, adjust, and/or prioritize action(s) and/or tools(s) associated with a navigation sequence stored in knowledge base 320. For example, in a case where minimizing execution time is a priority, during adaptive agentic workflow plan generation 312, an ordered set of actions associated with a navigations sequence may be adapted to parallelize certain actions and/or eliminate non-essential steps. Similarly, a set of tools associated with the navigation sequence may be adapted such that alternative tools that result in faster performance of the ordered set of actions may be selected and included as part of agentic workflow plan 314.

Example Agentic Workflow Assistance

Figure 4:
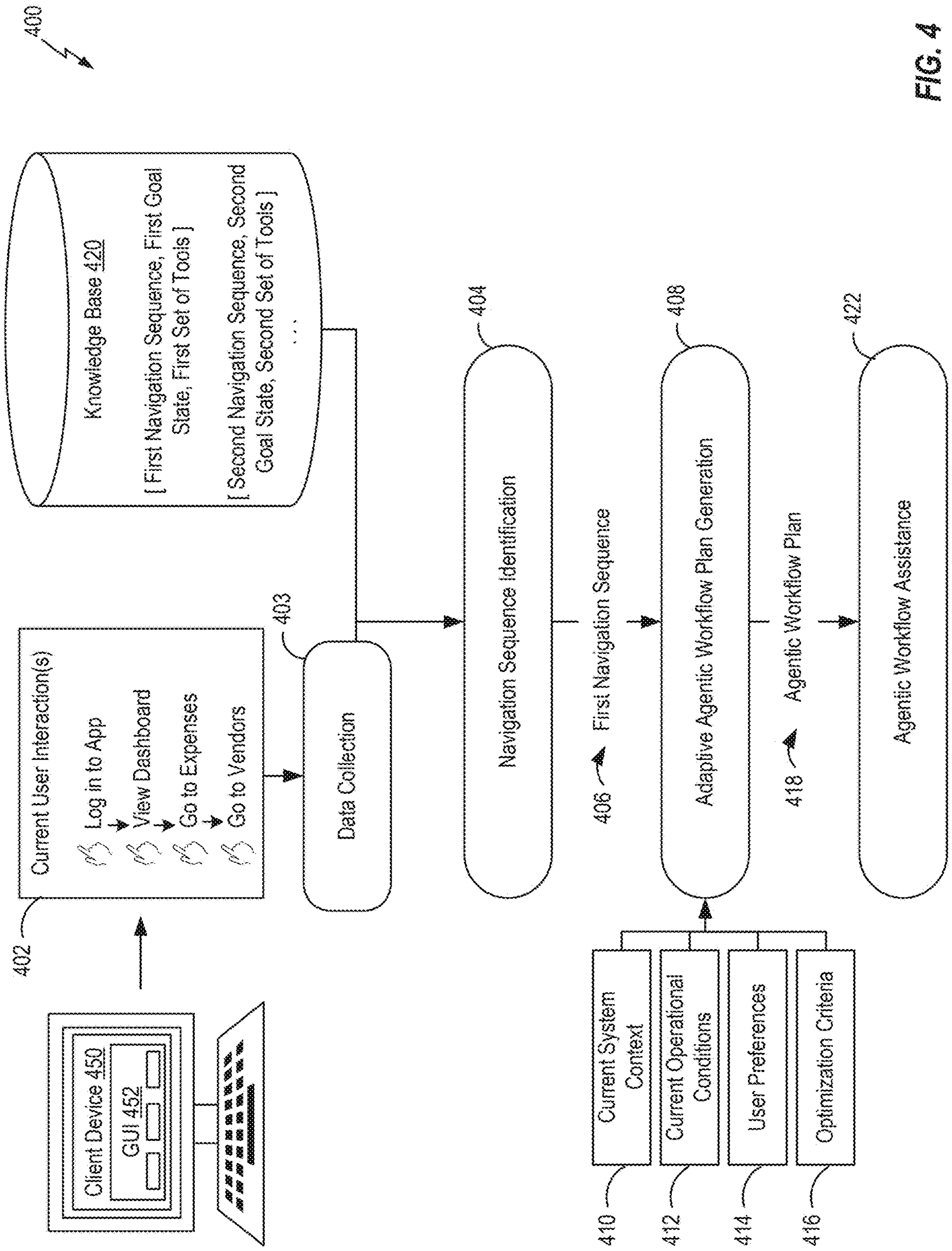
FIG. 4 depicts example agentic workflow assistance provided by an autonomous agent.

FIG. 4 depicts an example process 400 for providing agentic workflow assistance 422. In certain aspects, an autonomous agent of an agentic workflow assistance service, such as the agentic workflow assistance service depicted and described herein with respect to FIG. 1, may provide the agentic workflow assistance 422 to a user to aid a user in the completion of a task or the achievement of a goal. Although not meant to be limiting to this particular example, example 400 may be performed to enable an autonomous agent to aid a user in the creation of a new bill for a vendor via an accounting software application (e.g., creation of the bill may serve as an internal record of a transaction where the user received goods and/or services from the vendor).

Process 400 begins with obtaining current user interaction(s) 402 of a user with a GUI, such as GUI 452 of client device 450 (e.g., an example of UI 152 of client device 150 depicted in FIG. 1). For example, during data collection 403, user interactions of the user with GUI 452 may be monitored. Based on the monitoring, current user interactions 402 with GUI 452, including (1) logging in to an application, (2) navigating to a dashboard of the application, (3) navigating to an "Expenses" screen provided by the application, and (4) navigating to a screen for a particular vendor, may be detected and recorded.

Navigation sequence identification 404 is then be performed to analyze current user interaction(s) 402 to determine whether current user interaction(s) 402 correspond to any of the navigation sequences included in knowledge base 420. In certain aspects, techniques that involve the use of hidden Markov Models, similarity metrics or matching, ML model predictions, and etc., as described above, may be used to make this determination. In certain aspects, knowledge base 420 may be an example of knowledge base 220 generated according to workflow 200 of FIG. 2. In this example, current user interaction(s) 402 may be determined to correspond to a subset of actions in a first ordered set of actions associated with a first navigation sequence 406 in knowledge base 420. For example, the first ordered set of actions associated with the first navigation sequence 406 may include [Login→Dashboard→Expenses→Vendors→Create Bill→Enter Details→Generate Bill]. The current user interaction(s) 402 may correspond to a subset of actions in the first ordered set of actions that includes [Login→Dashboard→Expenses→Vendors]. Put differently, the interactions of the user with GUI 452 may be recognized as corresponding to the initial actions of the first navigation sequence 406, which is associated with creating a new bill for a vendor (e.g., a corresponding first goal state of the first navigation sequence 406).

After the relevant navigation sequence (e.g., first navigation sequence 406) is identified, adaptive agentic workflow plan generation 408 is performed. Performance of adaptive agentic workflow plan generation may involve generating an agentic workflow plan 418 by adapting the first ordered set of actions and/or a first set of tools associated with first navigation sequence 406, and which are specified in knowledge base 420. This adaptation may be performed based on current system context 410, current operational conditions 412, user preferences 414, and/or optimization criteria 416. For instance, in this example, the user may prefer to save generated bills with a specific format. Thus, the first ordered set of actions may be adapted to include an additional action for selecting a report format prior to generating the bill.

Agentic workflow assistance 422 is then provided based on the generated agentic workflow plan 418. For example, in certain aspects, an agent may autonomously execute the remaining actions of the agentic workflow plan 418 that are necessary for generating the bill. For example, the agent may autonomously create a bill, enter details, select a specific format, and generate the bill with little or no intervention from the user. As another example, in certain aspects, an agent may provide assistance to the user to carry out the remaining actions of the agentic workflow plan 418. Example assistance may include generating a message for display to a user that guides the user in creating the bill, entering details, selecting the bill format, and generating the bill.

Although not specific to this example shown in FIG. 4, in certain aspects, providing agentic workflow assistance may include intervening to address error-prone and/or non-terminating actions of a user with GUI 452.

In some other examples, it is noted that agentic workflow assistance may be provided to a user by first identifying a specific goal of the user. In such cases, the system may determine a navigation sequence from a knowledge base that is associated with the identified goal. This navigation sequence may then be adapted for the specific user (e.g., taking into account user preferences, current system context, current operational conditions, and/or optimization criteria) to generate an adaptive agentic workflow plan. An autonomous agent may use this adaptive workflow plan to provide targeted assistance, supporting the user in efficiently achieving the desired goal.

In some other examples, it is noted that agentic workflow assistance may be provided to a user based on a user's request. For example, a user may trigger the generation of an agentic workflow plan, and subsequently assistance by an agent based on the generated agentic workflow plan, based on the user providing a prompt to the system. As used herein a "prompt," is a specific instruction and/or request, posed in natural language, given to a computer program and/or language model to perform a particular task and/or generate a specific output.

Example Method for Adaptive Agentic Workflow Plan Generation

Figure 5:
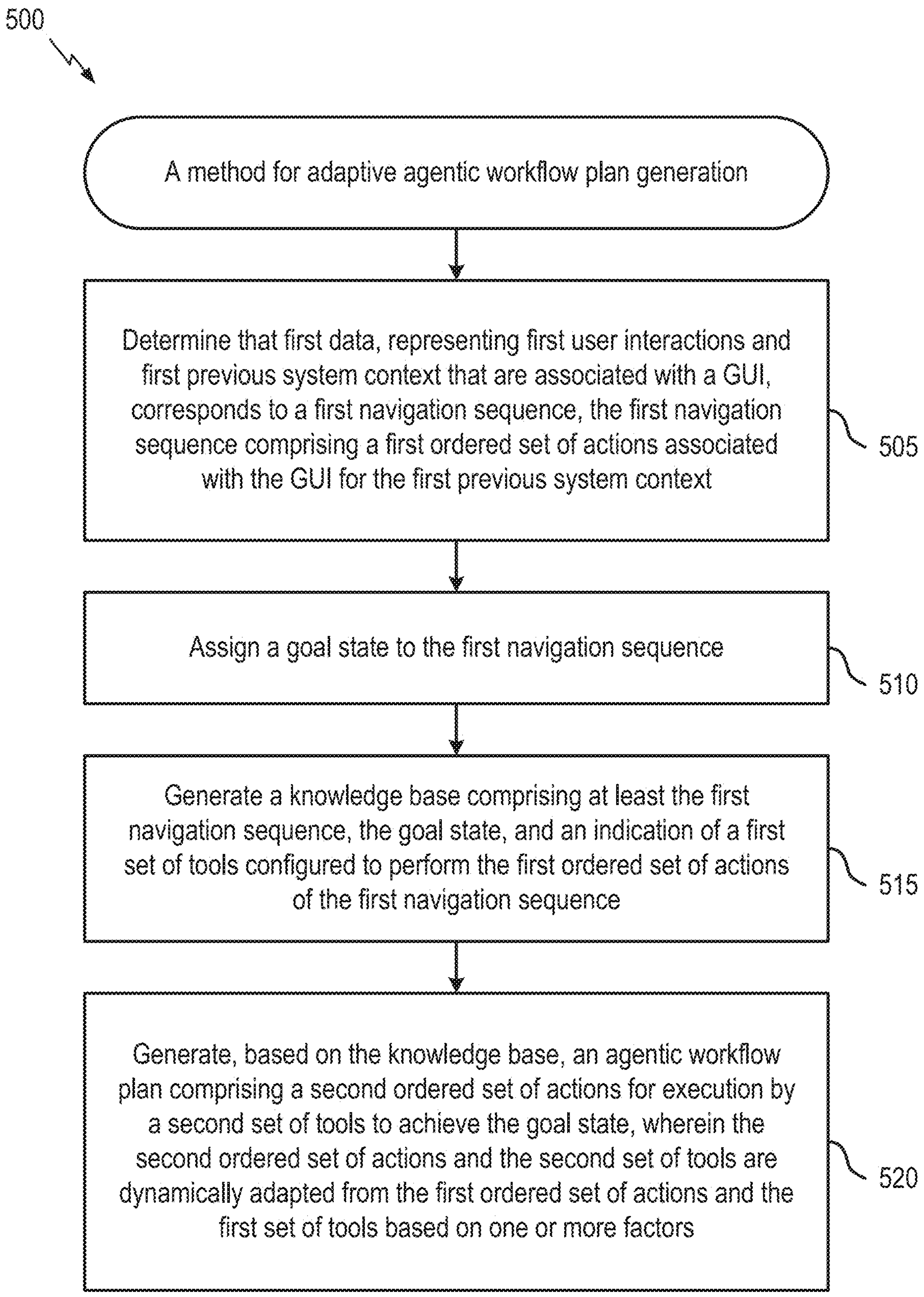
FIG. 5 depicts an example method for adaptive agentic workflow plan generation.

FIG. 5 depicts an example method 500 for adaptive agentic workflow plan generation. In one aspect, method 500 can be implemented by the system 100 of FIG. 1 and/or processing system 700 of FIG. 7.

Method 500 begins at block 505 with determining that first data, representing first user interactions and first previous system context that are associated with a GUI, corresponds to a first navigation sequence, the first navigation sequence comprising a first ordered set of actions associated with the GUI for the first previous system context. Example determination that first data corresponds to a first navigation sequence is depicted and described above with respect to navigation sequence identification 206 of FIG. 2.

Method 500 then proceeds to block 510 with assigning a goal state to the first navigation sequence. Example assignment of a goal state to a first navigation sequence is depicted and described above with respect to goal state association 210 of FIG. 2.

Method 500 then proceeds to block 515 with generating a knowledge base comprising at least the first navigation sequence, the goal state, and an indication of a first set of tools configured to perform the first ordered set of actions of the first navigation sequence. Example generation of a knowledge base is depicted and described above with respect to knowledge base generation 216 of FIG. 2.

Method 500 then proceeds to block 520 with generating, based on the knowledge base, an agentic workflow plan comprising a second ordered set of actions for execution by a second set of tools to achieve the goal state, wherein the second ordered set of actions and the second set of tools are dynamically adapted from the first ordered set of actions and the first set of tools based on one or more factors. Example generation of an agentic workflow plan is depicted and described above with respect to adaptive agentic workflow plan generation 312 of FIG. 3.

In some aspects, the one or more factors comprise at least one of: current system context, one or more user preferences, one or more operational conditions; or optimization criteria.

In some aspects, method 500 further includes providing, via the GUI and based on the agentic workflow plan, agentic workflow assistance by: executing one or more actions of the second ordered set of actions using one or more tools of the second set of tools generating, for display via the GUI, user guidance information to aid a user in the execution of the one or more actions of the second ordered set of actions.

In some aspects, the first data representing the first user interactions and the first previous system context that are associated with the GUI comprises at least one of: clickstream data; GUI instrumentation data; static code analysis data; or runtime profiling data.

In some aspects, block 505 includes: modeling the first data as a plurality of observable outputs of an HMM; inferring a sequence of hidden states based on the plurality of observable outputs; and determining the first data corresponds to the first navigation sequence based on the plurality of observable outputs and the sequence of hidden states.

In some aspects, block 505 includes: applying a sequential pattern mining algorithm to historical data, representing historical user interactions and historical system context that are associated with the GUI, to identify a plurality of navigation sequences, wherein: each navigation sequence comprises a respective ordered set of actions, and the plurality of navigation sequences comprise at least the first navigation sequence; and determining the first data corresponds to the first navigation sequence based on a similarity of the first data to the first ordered set of actions: being greater than the similarity of the first data to any other ordered set of actions for any other navigation sequence of the plurality of navigation sequences; or satisfying a threshold similarity.

In some aspects, block 505 includes: classifying, with a ML model, the first data as the first ordered set of actions of the first navigation sequence; and obtaining an indication of the first navigation sequence as output from the ML model.

In some aspects, the goal state is assigned to the first navigation sequence based on a plurality of heuristic-based rules associated with a plurality of goal states, including the goal state.

In some aspects, block 510 includes: assigning a plurality of semantic tags to the first ordered set of actions; and determining the goal state associated with the first navigation sequence based on the plurality of semantic tags.

In some aspects, block 510 includes: processing, with a ML model trained to predict goals states for ordered sets of actions, the first ordered set of actions of the first navigation sequence to generate the goal state; and obtaining an indication of the goal state as output from the ML model.

In some aspects, block 510 includes: requesting, via the GUI, user feedback regarding the goal state of the first navigation sequence; and obtaining the user feedback via the GUI.

In some aspects, method 500 further includes determining that second data, representing second user interactions and second previous system context that are associated with the GUI, corresponds to a second navigation sequence comprising a third ordered set of actions associated with the GUI for the second previous system context.

In some aspects, method 500 further includes determining the third ordered set of actions do not satisfy one or more criteria, wherein: the knowledge base comprises a plurality of navigation sequences, the plurality of navigation sequences include the first navigation sequence, and based on the second ordered set of actions of the second navigation sequence not satisfying the one or more criteria, the plurality of navigation sequences do not include the second navigation sequence.

In some aspects, the one or more criteria are associated with an identification of navigation sequences comprising ordered sets of actions that are characterized by at least one of: a non-terminating or recursive loop; an error or failure rate that exceeds a threshold; user abandonment or a task cancellation; a first incompatibility with system resources; or a second incompatibility with one or more available tools.

In some aspects, the knowledge base comprises: a plurality of navigation sequences, including the first navigation sequence; and for each navigation sequence of the plurality of navigation sequences: a respective goal state, and a respective indication of a set of tools configured to perform a respective ordered set of actions associated with the navigation sequence.

Note that FIG. 5 is just one example of a method, and other methods including fewer, additional, or alternative operations are possible consistent with this disclosure.

Example Method for Providing Agentic Workflow Assistance

Figure 6:
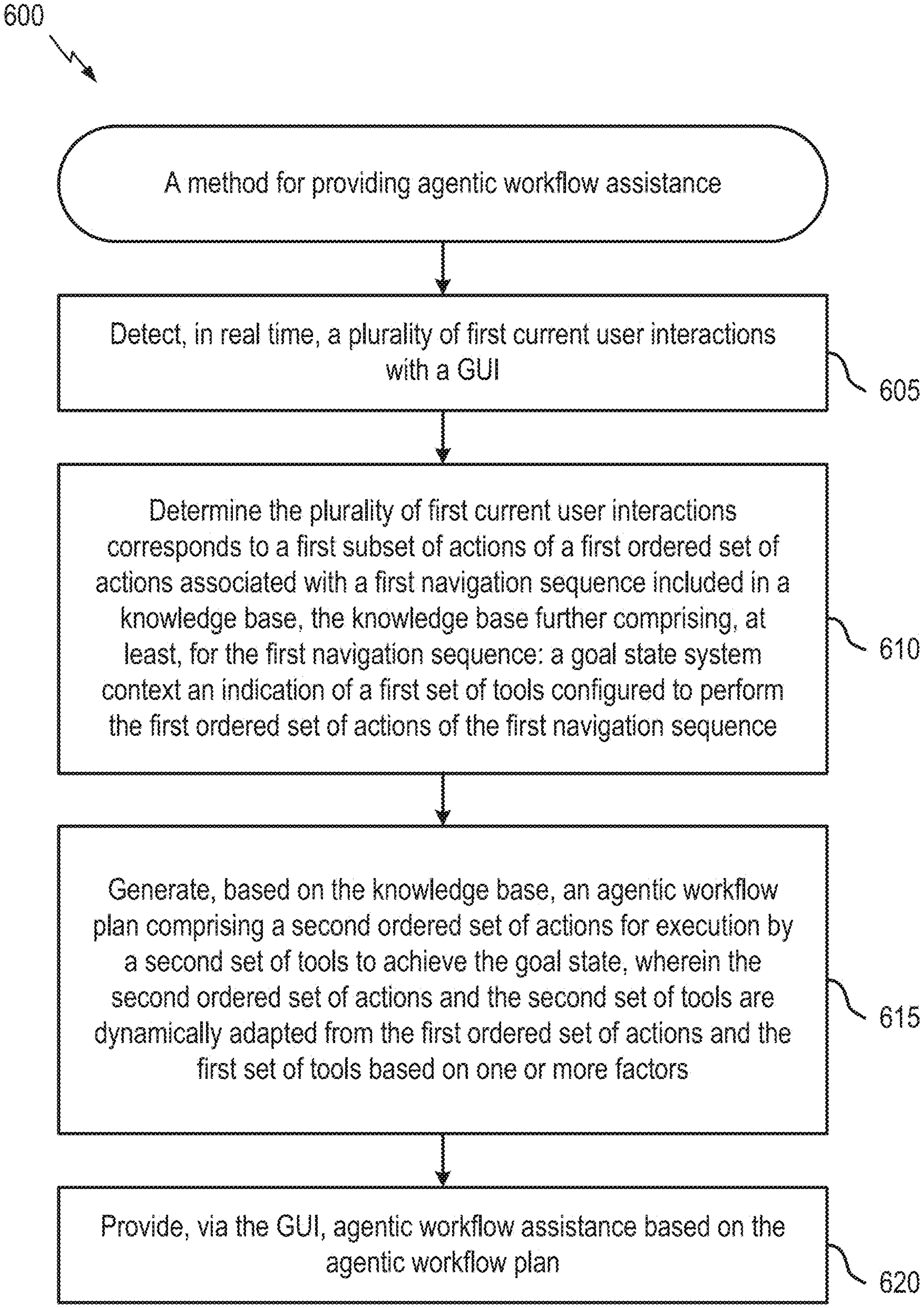
FIG. 6 depicts an example method for providing agentic workflow assistance.

FIG. 6 depicts an example method 600 for providing agentic workflow assistance. In one aspect, method 600 can be implemented by the system 100 of FIG. 1 and/or processing system 800 of FIG. 8.

Method 600 begins at block 605 with detecting, in real time, a plurality of first current user interactions with a GUI. Example detection of a plurality of first current interactions with a GUI is depicted and described above with respect to data collection 403 of FIG. 4.

Method 600 then proceeds to block 610 with determining the plurality of first current user interactions corresponds to a first subset of actions of a first ordered set of actions associated with a first navigation sequence included in a knowledge base, the knowledge base further comprising, at least, for the first navigation sequence: a goal state system context an indication of a first set of tools configured to perform the first ordered set of actions of the first navigation sequence. Example determination that the plurality of first current user interactions corresponds to a first subset of actions of a first ordered set of actions associated with a first navigation sequence included in a knowledge base is depicted and described above with respect to navigation sequence identification 404 of FIG. 4.

Method 600 then proceeds to block 615 with generating, based on the knowledge base, an agentic workflow plan comprising a second ordered set of actions for execution by a second set of tools to achieve the goal state, wherein the second ordered set of actions and the second set of tools are dynamically adapted from the first ordered set of actions and the first set of tools based on one or more factors. Example generation of an agentic workflow plan is depicted and described above with respect to adaptive agentic workflow plan generation 408 of FIG. 4.

Method 600 then proceeds to block 620 with providing, via the GUI, agentic workflow assistance based on the agentic workflow plan. Example providing of agentic workflow assistance is depicted and described above with respect to agentic workflow assistance 422 of FIG. 4.

In some aspects, block 620 includes executing one or more actions of the second ordered set of actions using one or more tools of the second set of tools.

In some aspects, method 600 further includes detecting a second current user interaction with the GUI, wherein execution of the one or more actions is triggered based on the detection of the second current user interaction.

In some aspects, block 620 includes generating, for display via the GUI, user guidance information to aid a user in the execution of one or more actions of the second ordered set of actions.

In some aspects, the one or more factors comprise at least one of: current system context, one or more user preferences, one or more operational conditions; or optimization criteria.

In some aspects, block 610 includes: modeling the plurality of first current user interactions as a plurality of observable outputs of an HMM; inferring a sequence of hidden states based on the plurality of observable outputs; and determining the plurality of first current user interactions corresponds to the first subset of actions of the first ordered set of actions based on the plurality of observable outputs and the sequence of hidden states.

In some aspects, the knowledge base comprises a plurality of navigation sequences, including the first navigation sequence; determining the plurality of first current user interactions corresponds to the first subset of actions of the first ordered set of actions is based on a similarity of the plurality of first current user interactions to the first ordered set of actions: being greater than the similarity of the plurality of first current user interactions to any other ordered set of actions for any other navigation sequence in the plurality of navigation sequences included in the knowledge base; or satisfying a threshold similarity.

In some aspects, block 610 includes: classifying, with a ML model, the plurality of first current user interactions as the first subset of actions of the first ordered set of actions of the first navigation sequence; and obtaining an indication of the first navigation sequence as output from the ML model.

In some aspects, the knowledge base comprises: a plurality of navigation sequences, including the first navigation sequence; and for each navigation sequence of the plurality of navigation sequences: a respective goal state, and a respective indication of a set of tools configured to perform a respective ordered set of actions associated with the navigation sequence.

Note that FIG. 6 is just one example of a method, and other methods including fewer, additional, or alternative operations are possible consistent with this disclosure.

Example Processing System for Adaptive Agentic Workflow Plan Generation

Figure 7:
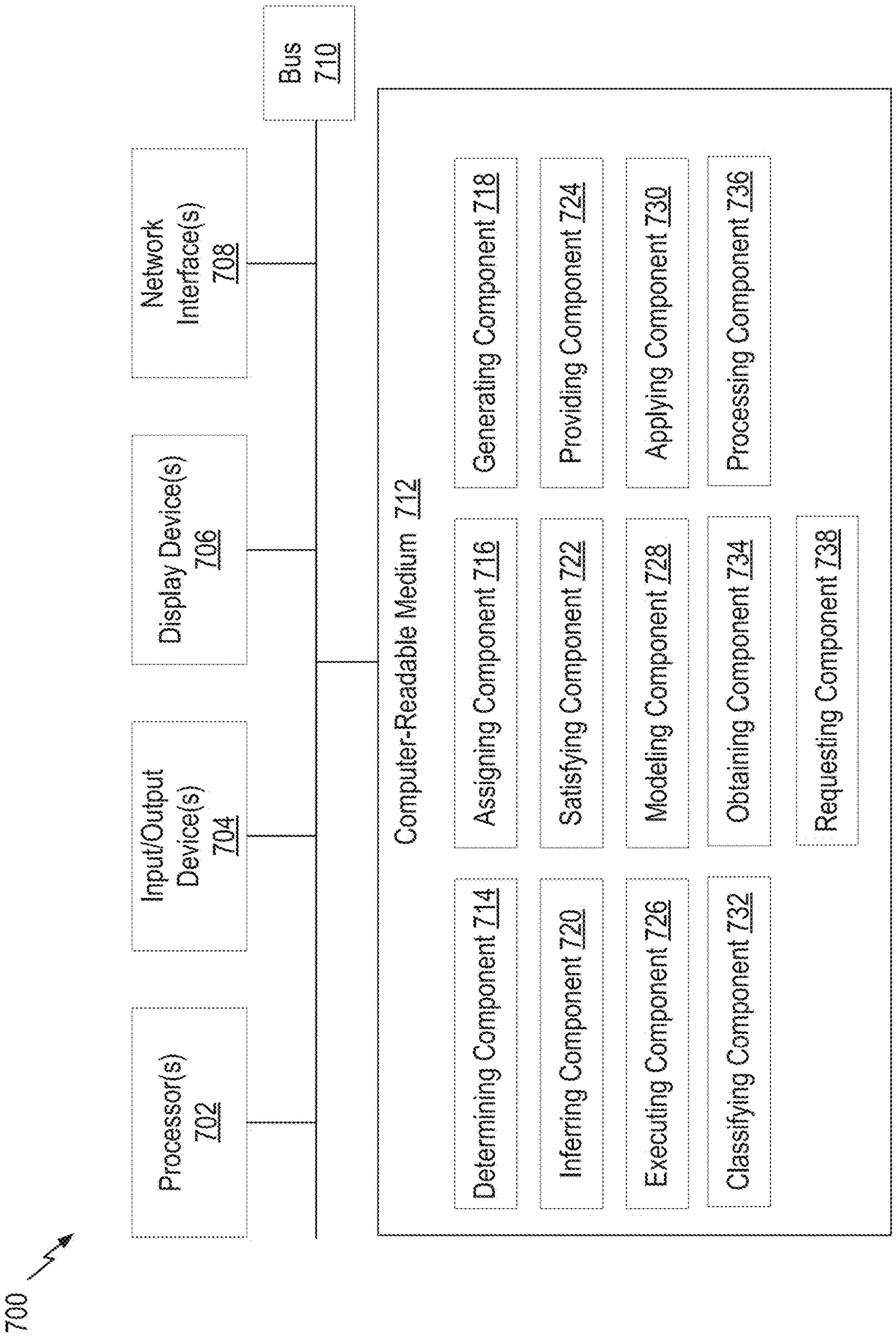
FIG. 7 depicts an example processing system with which aspects of the present disclosure can be performed.

FIG. 7 depicts an example processing system 700 configured to perform various aspects described herein, including, for example, method 500 as described above with respect to FIG. 5.

Processing system 700 is an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 700 includes one or more processors 702, one or more input/output devices 704, one or more display devices 706, one or more network interfaces 708 through which processing system 700 is connected to one or more networks (e.g., a local network, an intranet, the Internet, or any other group of processing systems communicatively connected to each other), and computer-readable medium 712. In the depicted example, the aforementioned components are coupled by a bus 710, which may generally be configured for data exchange amongst the components. Bus 710 may be representative of multiple buses, while only one is depicted for simplicity.

Processor(s) 702 are generally configured to retrieve and execute instructions stored in one or more memories, including local memories like computer-readable medium 712, as well as remote memories and data stores. Similarly, processor(s) 702 are configured to store application data residing in local memories like the computer-readable medium 712, as well as remote memories and data stores. More generally, bus 710 is configured to transmit programming instructions and application data among the processor(s) 702, display device(s) 706, network interface(s) 708, and/or computer-readable medium 712. In certain embodiments, processor(s) 702 are representative of one or more central processing units (CPUs), graphics processing unit (GPUs), tensor processing unit (TPUs), accelerators, and other processing devices.

Input/output device(s) 704 may include any device, mechanism, system, interactive display, and/or various other hardware and software components for communicating information between processing system 700 and a user of processing system 700. For example, input/output device(s) 704 may include input hardware, such as a keyboard, touch screen, button, microphone, speaker, and/or other device for receiving inputs from the user and sending outputs to the user.

Display device(s) 706 may generally include any sort of device configured to display data, information, graphics, user interface elements, and the like to a user. For example, display device(s) 706 may include internal and external displays such as an internal display of a tablet computer or an external display for a server computer or a projector. Display device(s) 706 may further include displays for devices, such as augmented, virtual, and/or extended reality devices. In various embodiments, display device(s) 706 may be configured to display a graphical user interface.

Network interface(s) 708 provide processing system 700 with access to external networks and thereby to external processing systems. Network interface(s) 708 can generally be any hardware and/or software capable of transmitting and/or receiving data via a wired or wireless network connection. Accordingly, network interface(s) 708 can include a communication transceiver for sending and/or receiving any wired and/or wireless communication.

Computer-readable medium 712 may be a volatile memory, such as a random access memory (RAM), or a nonvolatile memory, such as nonvolatile random access memory (NVRAM), or the like. In this example, computer-readable medium 712 includes determining component 714, assigning component 716, generating component 718, inferring component 720, satisfying component 722, providing component 724, executing component 726, modeling component 728, applying component 730, classifying component 732, obtaining component 734, processing component 736, and requesting component 738. Processing of the components 714-738 may enable and cause the processing system 700 to perform the method 500 described with respect to FIG. 5, or any aspect related to it.

In certain embodiments, determining component 714 is configured to determine that first data, representing first user interactions and first previous system context that are associated with a GUI, corresponds to a first navigation sequence, the first navigation sequence comprising a first ordered set of actions associated with the GUI for the first previous system context, as described in FIG. 5 with reference to block 505. In certain embodiments, assigning component 716 is configured to assign a goal state to the first navigation sequence, as described in FIG. 5 with reference to block 510. In certain embodiments, generating component 718 is configured to generate a knowledge base comprising at least the first navigation sequence, the goal state, and an indication of a first set of tools configured to perform the first ordered set of actions of the first navigation sequence, as described in FIG. 5 with reference to block 515. In certain embodiments, generating component 718 is configured to generate, based on the knowledge base, an agentic workflow plan comprising a second ordered set of actions for execution by a second set of tools to achieve the goal state, wherein the second ordered set of actions and the second set of tools are dynamically adapted from the first ordered set of actions and the first set of tools based on one or more factors, as described in FIG. 5 with reference to block 520.

Note that FIG. 7 is just one example of a processing system consistent with aspects described herein, and other processing systems having additional, alternative, or fewer components are possible consistent with this disclosure.

Example Processing System for Providing Agentic Workflow Assistance

Figure 8:
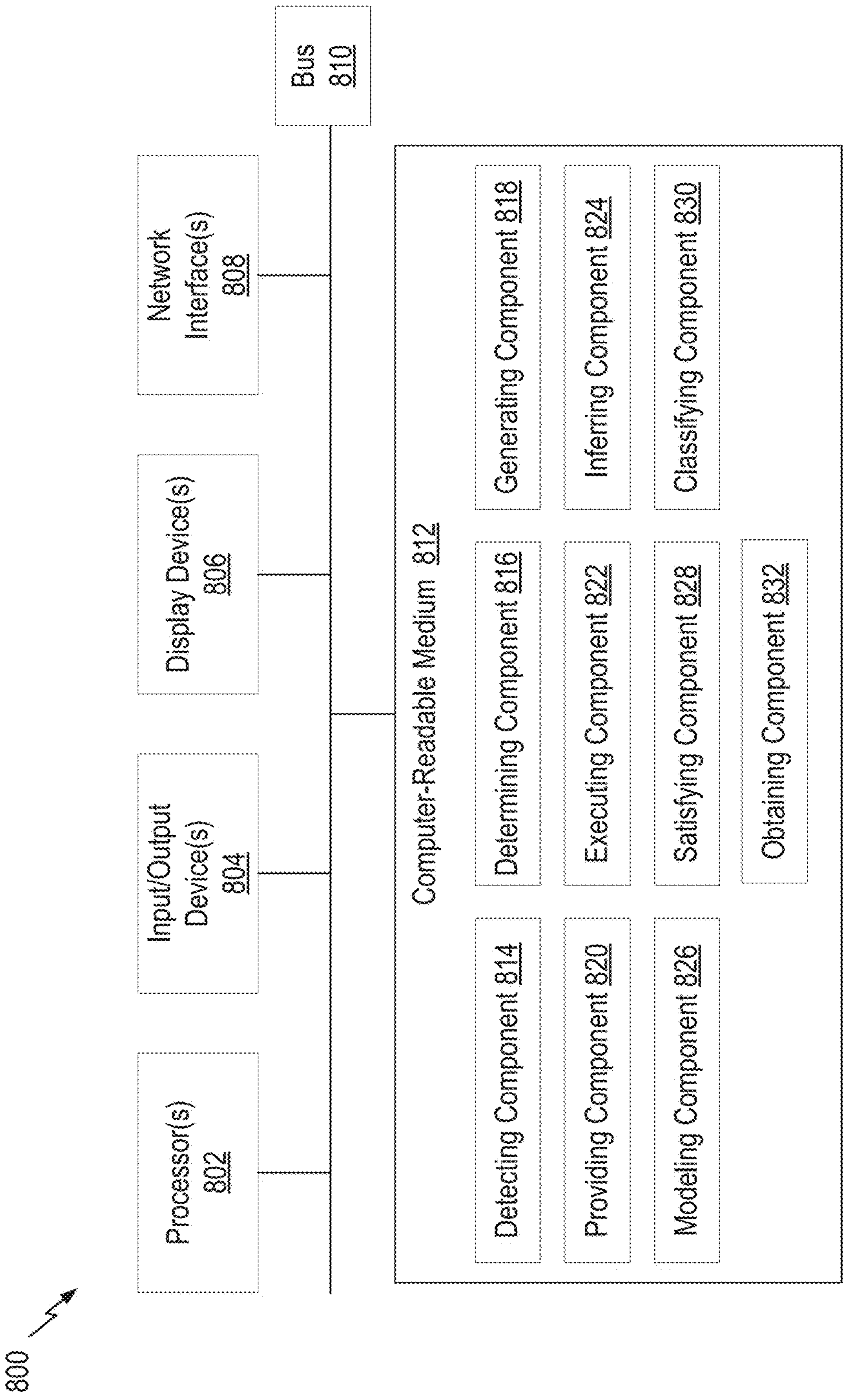
FIG. 8 depicts an example processing system with which aspects of the present disclosure can be performed.

FIG. 8 depicts an example processing system 800 configured to perform various aspects described herein, including, for example, method 600 as described above with respect to FIG. 6.

Processing system 800 is an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 800 includes one or more processors 802, one or more input/output devices 804, one or more display devices 806, one or more network interfaces 808 through which processing system 800 is connected to one or more networks (e.g., a local network, an intranet, the Internet, or any other group of processing systems communicatively connected to each other), and computer-readable medium 812. In the depicted example, the aforementioned components are coupled by a bus 810, which may generally be configured for data exchange amongst the components. Bus 810 may be representative of multiple buses, while only one is depicted for simplicity.

Processor(s) 802 are generally configured to retrieve and execute instructions stored in one or more memories, including local memories like computer-readable medium 812, as well as remote memories and data stores. Similarly, processor(s) 802 are configured to store application data residing in local memories like the computer-readable medium 812, as well as remote memories and data stores. More generally, bus 810 is configured to transmit programming instructions and application data among the processor(s) 802, display device(s) 806, network interface(s) 808, and/or computer-readable medium 812. In certain embodiments, processor(s) 802 are representative of one or more central processing units (CPUs), graphics processing unit (GPUs), tensor processing unit (TPUs), accelerators, and other processing devices.

Input/output device(s) 804 may include any device, mechanism, system, interactive display, and/or various other hardware and software components for communicating information between processing system 800 and a user of processing system 800. For example, input/output device(s) 804 may include input hardware, such as a keyboard, touch screen, button, microphone, speaker, and/or other device for receiving inputs from the user and sending outputs to the user.

Display device(s) 806 may generally include any sort of device configured to display data, information, graphics, user interface elements, and the like to a user. For example, display device(s) 806 may include internal and external displays such as an internal display of a tablet computer or an external display for a server computer or a projector. Display device(s) 806 may further include displays for devices, such as augmented, virtual, and/or extended reality devices. In various embodiments, display device(s) 806 may be configured to display a graphical user interface.

Network interface(s) 808 provide processing system 800 with access to external networks and thereby to external processing systems. Network interface(s) 808 can generally be any hardware and/or software capable of transmitting and/or receiving data via a wired or wireless network connection. Accordingly, network interface(s) 808 can include a communication transceiver for sending and/or receiving any wired and/or wireless communication.

Computer-readable medium 812 may be a volatile memory, such as a random access memory (RAM), or a nonvolatile memory, such as nonvolatile random access memory (NVRAM), or the like. In this example, computer-readable medium 812 includes detecting component 814, determining component 816, generating component 818, providing component 820, executing component 822, inferring component 824, modeling component 826, satisfying component 828, classifying component 830, and obtaining component 832. Processing of the components 814-832 may enable and cause the processing system 800 to perform the method 600 described with respect to FIG. 6, or any aspect related to it.

In certain embodiments, detecting component 814 is configured to detect, in real time, a plurality of first current user interactions with a GUI, as described in FIG. 6 with reference to block 605. In certain embodiments, determining component 816 is configured to determine the plurality of first current user interactions corresponds to a first subset of actions of a first ordered set of actions associated with a first navigation sequence included in a knowledge base, the knowledge base further comprising, at least, for the first navigation sequence: a goal state; system context; and an indication of a first set of tools configured to perform the first ordered set of actions of the first navigation sequence, as described in FIG. 6 with reference to block 610. In certain embodiments, generating component 818 is configured to generate, based on the knowledge base, an agentic workflow plan comprising a second ordered set of actions for execution by a second set of tools to achieve the goal state, wherein the second ordered set of actions and the second set of tools are dynamically adapted from the first ordered set of actions and the first set of tools based on one or more factors, as described in FIG. 6 with reference to block 615. In certain embodiments, providing component 820 is configured to provide, via the GUI, agentic workflow assistance based on the agentic workflow plan, as described in FIG. 6 with reference to block 620.

Note that FIG. 8 is just one example of a processing system consistent with aspects described herein, and other processing systems having additional, alternative, or fewer components are possible consistent with this disclosure.

EXAMPLE CLAUSES

Implementation examples are described in the following numbered clauses:

Clause 1: A method for adaptive agentic workflow plan generation, comprising: determining that first data, representing first user interactions and first previous system context that are associated with a GUI, corresponds to a first navigation sequence, the first navigation sequence comprising a first ordered set of actions associated with the GUI for the first previous system context; assigning a goal state to the first navigation sequence; generating a knowledge base comprising at least the first navigation sequence, the goal state, and an indication of a first set of tools configured to perform the first ordered set of actions of the first navigation sequence; and generating, based on the knowledge base, an agentic workflow plan comprising a second ordered set of actions for execution by a second set of tools to achieve the goal state, wherein the second ordered set of actions and the second set of tools are dynamically adapted from the first ordered set of actions and the first set of tools based on one or more factors.

Clause 2: The method of Clause 1, wherein the one or more factors comprise at least one of: current system context, one or more user preferences, one or more operational conditions; or optimization criteria.

Clause 3: The method of any one of Clauses 1-2, further comprising providing, via the GUI and based on the agentic workflow plan, agentic workflow assistance by: executing one or more actions of the second ordered set of actions using one or more tools of the second set of tools generating, for display via the GUI, user guidance information to aid a user in the execution of the one or more actions of the second ordered set of actions.

Clause 4: The method of any one of Clauses 1-3, wherein the first data representing the first user interactions and the first previous system context that are associated with the GUI comprises at least one of: clickstream data; GUI instrumentation data; static code analysis data; or runtime profiling data.

Clause 5: The method of any one of Clauses 1-4, wherein determining the first data corresponds to the first navigation sequence comprises: modeling the first data as a plurality of observable outputs of an HMM; inferring a sequence of hidden states based on the plurality of observable outputs; and determining the first data corresponds to the first navigation sequence based on the plurality of observable outputs and the sequence of hidden states.

Clause 6: The method of any one of Clauses 1-5, wherein determining the first data corresponds to the first navigation sequence comprises: applying a sequential pattern mining algorithm to historical data, representing historical user interactions and historical system context that are associated with the GUI, to identify a plurality of navigation sequences, wherein: each navigation sequence comprises a respective ordered set of actions, and the plurality of navigation sequences comprise at least the first navigation sequence; and determining the first data corresponds to the first navigation sequence based on a similarity of the first data to the first ordered set of actions: being greater than the similarity of the first data to any other ordered set of actions for any other navigation sequence of the plurality of navigation sequences; or satisfying a threshold similarity.

Clause 7: The method of any one of Clauses 1-6, wherein determining the first data corresponds to the first navigation sequence comprises: classifying, with a ML model, the first data as the first ordered set of actions of the first navigation sequence; and obtaining an indication of the first navigation sequence as output from the ML model.

Clause 8: The method of any one of Clauses 1-7, wherein the goal state is assigned to the first navigation sequence based on a plurality of heuristic-based rules associated with a plurality of goal states, including the goal state.

Clause 9: The method of any one of Clauses 1-8, wherein assigning the goal state to the first navigation sequence comprises: assigning a plurality of semantic tags to the first ordered set of actions; and determining the goal state associated with the first navigation sequence based on the plurality of semantic tags.

Clause 10: The method of any one of Clauses 1-9, wherein assigning the goal state to the first navigation sequence comprises: processing, with a ML model trained to predict goals states for ordered sets of actions, the first ordered set of actions of the first navigation sequence to generate the goal state; and obtaining an indication of the goal state as output from the ML model.

Clause 11: The method of any one of Clauses 1-10, wherein assigning the goal state to the first navigation sequence comprises: requesting, via the GUI, user feedback regarding the goal state of the first navigation sequence; and obtaining the user feedback via the GUI.

Clause 12: The method of any one of Clauses 1-11, further comprising: determining that second data, representing second user interactions and second previous system context that are associated with the GUI, corresponds to a second navigation sequence comprising a third ordered set of actions associated with the GUI for the second previous system context; and determining the third ordered set of actions do not satisfy one or more criteria, wherein: the knowledge base comprises a plurality of navigation sequences, the plurality of navigation sequences include the first navigation sequence, and based on the second ordered set of actions of the second navigation sequence not satisfying the one or more criteria, the plurality of navigation sequences do not include the second navigation sequence.

Clause 13: The method of Clause 12, wherein the one or more criteria are associated with an identification of navigation sequences comprising ordered sets of actions that are characterized by at least one of: a non-terminating or recursive loop; an error or failure rate that exceeds a threshold; user abandonment or a task cancellation; a first incompatibility with system resources; or a second incompatibility with one or more available tools.

Clause 14: The method of any one of Clauses 1-13, wherein the knowledge base comprises: a plurality of navigation sequences, including the first navigation sequence; and for each navigation sequence of the plurality of navigation sequences: a respective goal state, and a respective indication of a set of tools configured to perform a respective ordered set of actions associated with the navigation sequence.

Clause 15: A method for providing agentic workflow assistance, comprising: detecting, in real time, a plurality of first current user interactions with a GUI; determining the plurality of first current user interactions corresponds to a first subset of actions of a first ordered set of actions associated with a first navigation sequence included in a knowledge base, the knowledge base further comprising, at least, for the first navigation sequence: a goal state system context an indication of a first set of tools configured to perform the first ordered set of actions of the first navigation sequence; generating, based on the knowledge base, an agentic workflow plan comprising a second ordered set of actions for execution by a second set of tools to achieve the goal state, wherein the second ordered set of actions and the second set of tools are dynamically adapted from the first ordered set of actions and the first set of tools based on one or more factors; and providing, via the GUI, agentic workflow assistance based on the agentic workflow plan.

Clause 16: The method of Clause 15, wherein providing the agentic workflow assistance comprises executing one or more actions of the second ordered set of actions using one or more tools of the second set of tools.

Clause 17: The method of Clause 16, further comprising: detecting a second current user interaction with the GUI, wherein execution of the one or more actions is triggered based on the detection of the second current user interaction.

Clause 18: The method of any one of Clauses 15-17, wherein providing the agentic workflow assistance comprises generating, for display via the GUI, user guidance information to aid a user in the execution of one or more actions of the second ordered set of actions.

Clause 19: The method of any one of Clauses 15-18, wherein the one or more factors comprise at least one of: current system context, one or more user preferences, one or more operational conditions; or optimization criteria.

Clause 20: The method of any one of Clauses 15-19, wherein determining the plurality of first current user interactions corresponds to the first subset of actions of the first ordered set of actions comprises: modeling the plurality of first current user interactions as a plurality of observable outputs of a HMM; inferring a sequence of hidden states based on the plurality of observable outputs; and determining the plurality of first current user interactions corresponds to the first subset of actions of the first ordered set of actions based on the plurality of observable outputs and the sequence of hidden states.

Clause 21: The method of any one of Clauses 15-20, wherein: the knowledge base comprises a plurality of navigation sequences, including the first navigation sequence; determining the plurality of first current user interactions corresponds to the first subset of actions of the first ordered set of actions is based on a similarity of the plurality of first current user interactions to the first ordered set of actions: being greater than the similarity of the plurality of first current user interactions to any other ordered set of actions for any other navigation sequence in the plurality of navigation sequences included in the knowledge base; or satisfying a threshold similarity.

Clause 22: The method of any one of Clauses 15-21, wherein determining the plurality of first current user interactions corresponds to the first subset of actions of the first ordered set of actions comprises: classifying, with a ML model, the plurality of first current user interactions as the first subset of actions of the first ordered set of actions of the first navigation sequence; and obtaining an indication of the first navigation sequence as output from the ML model.

Clause 23: The method of any one of Clauses 15-22, wherein the knowledge base comprises: a plurality of navigation sequences, including the first navigation sequence; and for each navigation sequence of the plurality of navigation sequences: a respective goal state, and a respective indication of a set of tools configured to perform a respective ordered set of actions associated with the navigation sequence.

Clause 24: A processing system, comprising: memory comprising computer-executable instructions; and one or more processors configured to execute the computer-executable instructions and cause the processing system to perform a method in accordance with any one of Clauses 1-23.

Clause 25: A processing system, comprising means for performing a method in accordance with any one of Clauses 1-23.

Clause 26: A non-transitory computer-readable medium storing program code for causing a processing system to perform the steps of any one of Clauses 1-23.

Clause 27: A computer program product embodied on a computer-readable storage medium comprising code for performing a method in accordance with any one of Clauses 1-23.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for adaptive agentic workflow plan generation, comprising:

determining that first data, representing first user interactions and first previous system context that are associated with a graphical user interface (GUI), corresponds to a first navigation sequence, the first navigation sequence comprising a first ordered set of actions associated with the GUI for the first previous system context;

assigning a goal state to the first navigation sequence;

generating a knowledge base comprising at least the first navigation sequence, the goal state, and an indication of a first set of tools configured to perform the first ordered set of actions of the first navigation sequence;

determining that second data, representing second user interactions and second previous system context that are associated with the GUI, corresponds to a second navigation sequence comprising a second ordered set of actions associated with the GUI for the second previous system context;

determining the second ordered set of actions do not satisfy one or more criteria, wherein;

the knowledge base comprises a plurality of navigation sequences, including the first navigation sequence, and based on the second ordered set of actions of the second navigation sequence not satisfying the one or more criteria, the plurality of navigation sequences do not include the second navigation sequence;

generating, based on the knowledge base, an agentic workflow plan comprising a third ordered set of actions for execution by a second set of tools to achieve the goal state, wherein the third ordered set of actions and the second set of tools are dynamically adapted from the first ordered set of actions and the first set of tools based on one or more factors; and providing, via the GUI and based on the agentic workflow plan, agentic workflow assistance by executing, by an autonomous agent, one or more actions of the third ordered set of actions using one or more tools of the second set of tools.

2. The method of claim 1, wherein the one or more factors comprise at least one of:

current system context, one or more user preferences, one or more operational conditions; or optimization criteria.

3. The method of claim 1, wherein providing, via the GUI and based on the agentic workflow plan, the agentic workflow assistance further comprises generating, for display via the GUI, user guidance information to aid a user in the execution of the one or more actions of the second ordered set of actions.

4. The method of claim 1, wherein the first data representing the first user interactions and the first previous system context that are associated with the GUI comprises at least one of:

clickstream data;

GUI instrumentation data;

static code analysis data; or runtime profiling data.

5. The method of claim 1, wherein determining the first data corresponds to the first navigation sequence comprises:

modeling the first data as a plurality of observable outputs of a Hidden Markov Model (HMM);

inferring a sequence of hidden states based on the plurality of observable outputs; and determining the first data corresponds to the first navigation sequence based on the plurality of observable outputs and the sequence of hidden states.

6. The method of claim 1, wherein determining the first data corresponds to the first navigation sequence comprises:

applying a sequential pattern mining algorithm to historical data, representing historical user interactions and historical system context that are associated with the GUI, to identify a plurality of navigation sequences, wherein:

each navigation sequence comprises a respective ordered set of actions, and the plurality of navigation sequences comprise at least the first navigation sequence; and determining the first data corresponds to the first navigation sequence based on a similarity of the first data to the first ordered set of actions:

being greater than the similarity of the first data to any other ordered set of actions for any other navigation sequence of the plurality of navigation sequences; or satisfying a threshold similarity.

7. The method of claim 1, wherein determining the first data corresponds to the first navigation sequence comprises:

classifying, with a machine learning (ML) model, the first data as the first ordered set of actions of the first navigation sequence; and obtaining an indication of the first navigation sequence as output from the ML model.

8. The method of claim 1, wherein the goal state is assigned to the first navigation sequence based on a plurality of heuristic-based rules associated with a plurality of goal states, including the goal state.

9. The method of claim 1, wherein assigning the goal state to the first navigation sequence comprises:

assigning a plurality of semantic tags to the first ordered set of actions; and determining the goal state associated with the first navigation sequence based on the plurality of semantic tags.

10. The method of claim 1, wherein assigning the goal state to the first navigation sequence comprises:

processing, with a machine learning (ML) model trained to predict goals states for ordered sets of actions, the first ordered set of actions of the first navigation sequence to generate the goal state; and obtaining an indication of the goal state as output from the ML model.

11. The method of claim 1, wherein assigning the goal state to the first navigation sequence comprises:

requesting, via the GUI, user feedback regarding the goal state of the first navigation sequence; and obtaining the user feedback via the GUI.

12. The method of claim 1, wherein the one or more criteria are associated with an identification of navigation sequences comprising ordered sets of actions that are characterized by at least one of:

a non-terminating or recursive loop;

an error or failure rate that exceeds a threshold;

user abandonment or a task cancellation;

a first incompatibility with system resources; or a second incompatibility with one or more available tools.

13. The method of claim 1, wherein the second set of tools comprises modifications to the first set of tools.

14. A method for providing agentic workflow assistance, comprising:

detecting, in real time, a plurality of first current user interactions with a graphical user interface (GUI);

determining the plurality of first current user interactions corresponds to a first subset of actions of a first ordered set of actions associated with a first navigation sequence included in a knowledge base, wherein:

the knowledge base comprises a plurality of navigation sequences including the first navigation sequence, each navigation sequence of the plurality of navigation sequences comprises a respective ordered set of actions associated with the GUI for respective system context, the respective ordered set of actions associated with each navigation sequence satisfies one or more criteria, and the knowledge base further comprises for the first navigation sequence:

a goal state;

first system context; and an indication of a first set of tools configured to perform the first ordered set of actions of the first navigation sequence;

generating, based on the knowledge base, an agentic workflow plan comprising a second ordered set of actions for execution by a second set of tools to achieve the goal state, wherein the second ordered set of actions and the second set of tools are dynamically adapted from the first ordered set of actions and the first set of tools based on one or more factors; and providing, via the GUI, agentic workflow assistance based on the agentic workflow plan by executing, by an autonomous agent, one or more actions of the second ordered set of actions using one or more tools of the second set of tools.

15. The method of claim 14, further comprising:

detecting a second current user interaction with the GUI, wherein execution of the one or more actions is triggered based on the detection of the second current user interaction.

16. The method of claim 14, wherein providing the agentic workflow assistance comprises generating, for display via the GUI, user guidance information to aid a user in the execution of one or more actions of the second ordered set of actions.

17. The method of claim 14, wherein the one or more factors comprise at least one of:

current system context, one or more user preferences, one or more operational conditions; or optimization criteria.

18. The method of claim 14, wherein determining the plurality of first current user interactions corresponds to the first subset of actions of the first ordered set of actions comprises:

modeling the plurality of first current user interactions as a plurality of observable outputs of a Hidden Markov Model (HMM);

inferring a sequence of hidden states based on the plurality of observable outputs; and determining the plurality of first current user interactions corresponds to the first subset of actions of the first ordered set of actions based on the plurality of observable outputs and the sequence of hidden states.

19. A processing system, comprising:

memory comprising computer-executable instructions; and one or more processors configured to execute the computer-executable instructions and cause the processing system to:

determine that first data, representing first user interactions and first previous system context that are associated with a graphical user interface (GUI), corresponds to a first navigation sequence, the first navigation sequence comprising a first ordered set of actions associated with the GUI for the first previous system context;

assign a goal state to the first navigation sequence;

generate a knowledge base comprising at least the first navigation sequence, the goal state, and an indication of a first set of tools configured to perform the first ordered set of actions of the first navigation sequence;

determine that second data, representing second user interactions and second previous system context that are associated with the GUL corresponds to a second navigation sequence comprising a second ordered set of actions associated with the GUI for the second s system context;

determine the second ordered set of actions do not satisfy one or more criteria, wherein:

the knowledge base comprises a plurality of navigation sequences, including the first navigation sequence, and based on the second ordered set of actions of the second navigation sequence not satisfying the one or more criteria, the plurality of navigation sequences do not include the second navigation sequence;

generate, based on the knowledge base, an agentic workflow plan comprising a third ordered set of actions for execution by a second set of tools to achieve the goal state, wherein the third ordered set of actions and the second set of tools are dynamically adapted from the first ordered set of actions and the first set of tools based on one or more factors; and provide, via the GUI and based on the agentic workflow plan, agentic workflow assistance by executing, by an autonomous agent, one or more actions of the third ordered set of actions using one or more tools of the second set of tools.

20. The method of claim 14, wherein the second set of tools comprises modifications to the first set of tools.

* * * * *